United States Patent
Matsubara et al.

(10) Patent No.: US 10,607,356 B2
(45) Date of Patent: Mar. 31, 2020

(54) CONGESTION ANALYSIS DEVICE, CONGESTION ANALYSIS METHOD, AND CONGESTION ANALYSIS PROGRAM

(71) Applicant: HITACHI, LTD., Tokyo (JP)

(72) Inventors: Daisuke Matsubara, Tokyo (JP); Miyako Iida, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 120 days.

(21) Appl. No.: 15/760,704

(22) PCT Filed: May 13, 2016

(86) PCT No.: PCT/JP2016/064209
§ 371 (c)(1),
(2) Date: Mar. 16, 2018

(87) PCT Pub. No.: WO2017/141454
PCT Pub. Date: Aug. 24, 2017

(65) Prior Publication Data
US 2018/0286068 A1    Oct. 4, 2018

(51) Int. Cl.
*G06T 7/60* (2017.01)
*G06T 7/277* (2017.01)
(Continued)

(52) U.S. Cl.
CPC .................. *G06T 7/60* (2013.01); *G06T 7/20* (2013.01); *G06T 7/246* (2017.01); *G06T 7/277* (2017.01);
(Continued)

(58) Field of Classification Search
CPC ........... G06T 7/60; G06T 7/246; G06T 7/277; G06T 7/20; H04N 5/272
See application file for complete search history.

(56) References Cited

U.S. PATENT DOCUMENTS

2013/0113934 A1    5/2013 Hotta et al.
2015/0222861 A1    8/2015 Fujii et al.
(Continued)

FOREIGN PATENT DOCUMENTS

JP    2005-092657 A    4/2005
JP    2006-331065 A    12/2006
(Continued)

OTHER PUBLICATIONS

Japanese Office Action received in corresponding Japanese Application No. 2017-542207 dated May 8, 2018.
(Continued)

*Primary Examiner* — Leon Flores
(74) *Attorney, Agent, or Firm* — Mattingly & Malur, PC

(57) ABSTRACT

The present invention suitably determines how is congestion in an area. A congestion analysis device includes: a person classifying unit that is configured to determine, based on a moving image in which persons are photographed, the number of the persons; a motion trajectory determination unit that is configured to determine a motion trajectory of each of the persons; and a congestion information analysis unit that is configured to determine a state of each of the persons based on the motion trajectory thereof photographed in the moving image and also determine a congestion degree in accordance with the number of the persons and the state of each of the persons.

20 Claims, 18 Drawing Sheets

(51) Int. Cl.
*G06T 7/246* (2017.01)
*G06T 7/20* (2017.01)
*H04N 5/272* (2006.01)

(52) U.S. Cl.
CPC ... *H04N 5/272* (2013.01); *G06T 2207/30196* (2013.01); *G06T 2207/30241* (2013.01); *G06T 2207/30242* (2013.01)

(56) References Cited

U.S. PATENT DOCUMENTS

| | | | |
|---|---|---|---|
| 2015/0278608 A1* | 10/2015 | Matsumoto | G06K 9/00342 348/143 |
| 2015/0339519 A1 | 11/2015 | Ueta et al. | |
| 2017/0132475 A1 | 5/2017 | Oami et al. | |

FOREIGN PATENT DOCUMENTS

| | | |
|---|---|---|
| JP | 2007-317052 A | 12/2007 |
| JP | 2008-217184 A | 9/2008 |
| JP | 2009-110152 A | 5/2009 |
| JP | 2009-181556 A | 8/2009 |
| JP | 2010-169521 A | 8/2010 |
| JP | 2010-277547 A | 12/2010 |
| JP | 2012-022370 A | 2/2012 |
| JP | 2015-069639 A | 4/2015 |
| JP | 2015-149557 A | 8/2015 |
| JP | 2016-062414 A | 4/2016 |
| WO | 2012/161291 A1 | 11/2012 |
| WO | 2016/00240 A1 | 1/2016 |
| WO | 2017/155126 A1 | 9/2017 |

OTHER PUBLICATIONS

Hitachi Social Innovation Forum 2015, Tokyo.
Video Analysis of Passenger Flow at Railway Stations, Hitachi, Ltd. 2015.
International Application of PCT/JP2016/064209 dated Jun. 28, 2016.
Extended European Search Report received in corresponding European Application No. 16890594.1 dated Oct. 23, 2019.

* cited by examiner

FIG. 13
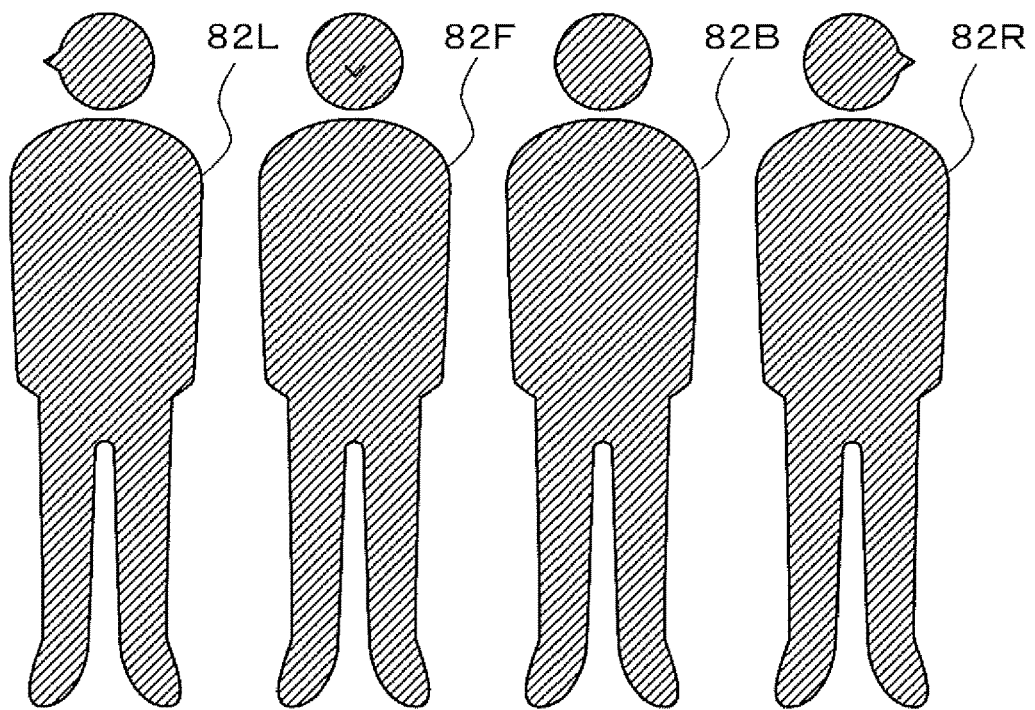
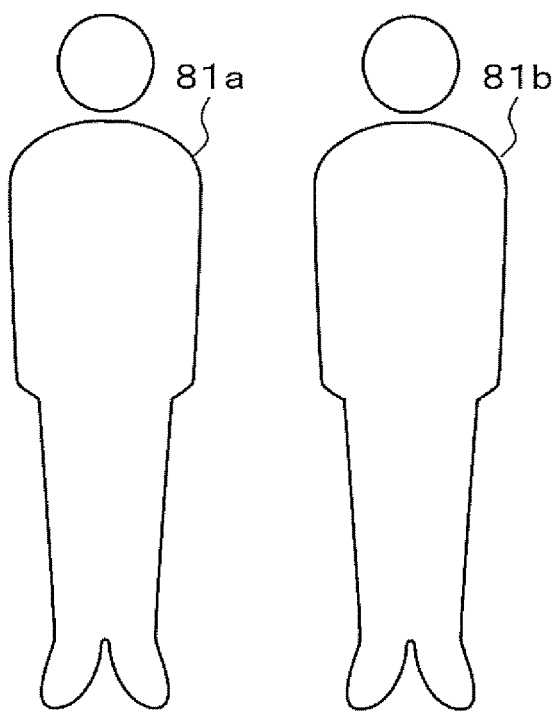

FIG. 15
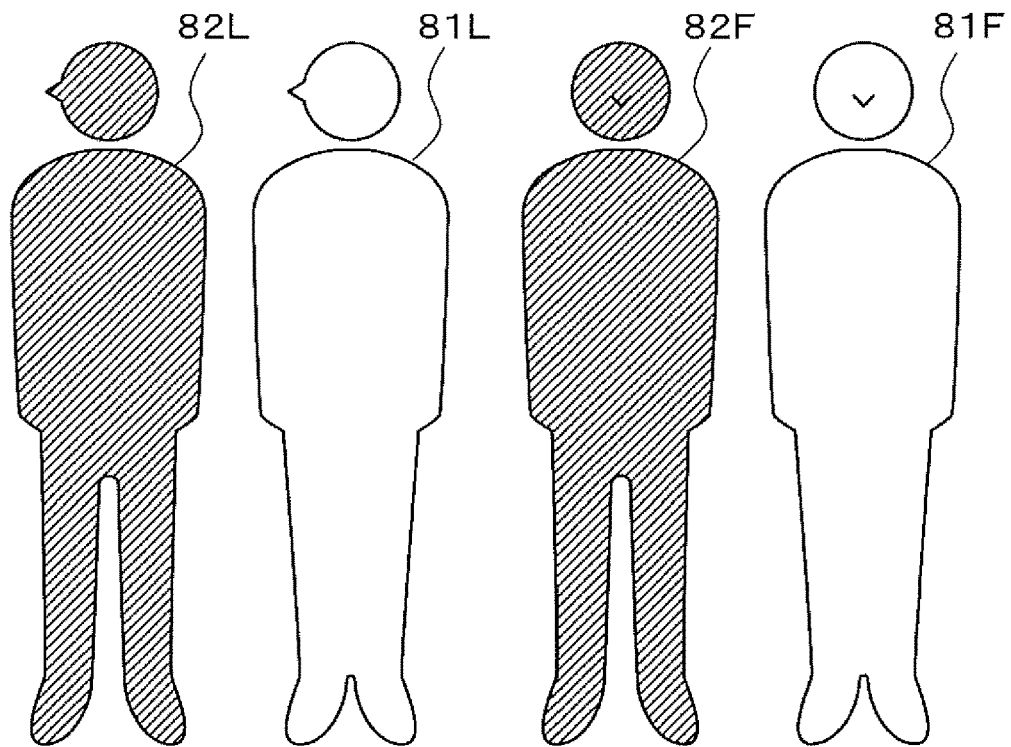
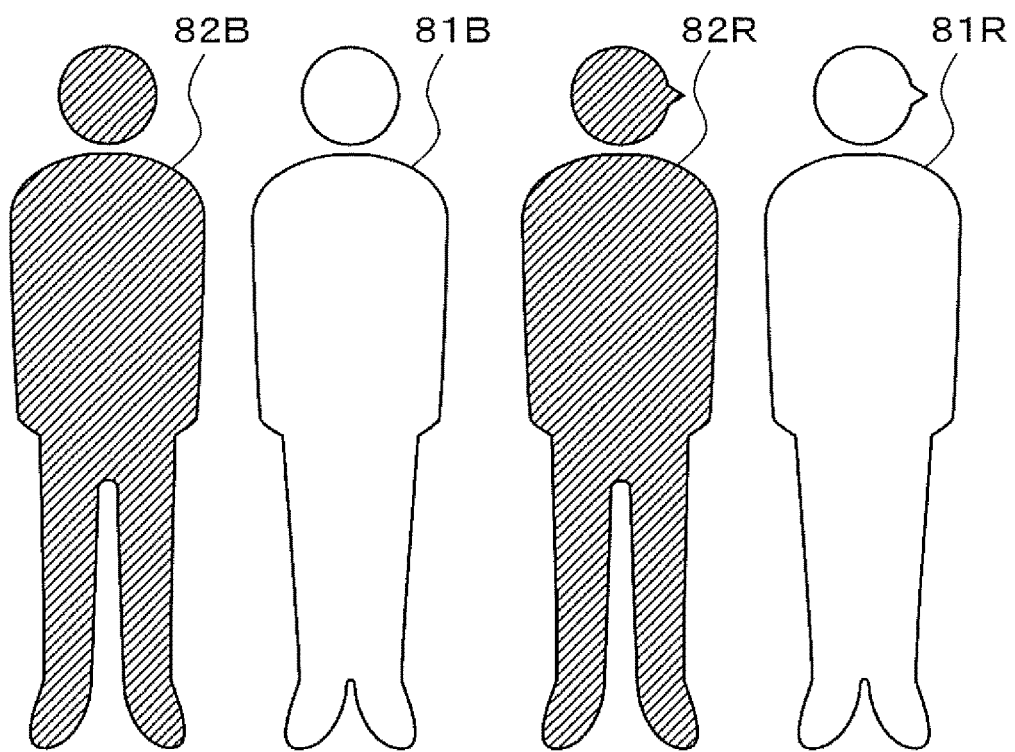

CONGESTION ANALYSIS DEVICE, CONGESTION ANALYSIS METHOD, AND CONGESTION ANALYSIS PROGRAM

TECHNICAL FIELD

The present invention relates to a congestion analysis device, a congestion analysis method, and a congestion analysis program.

BACKGROUND ART

Services by which a user can check an ever-changing congestion state at a station anytime, anywhere, in real-time have been recently provided, owing to progress in IT (Information Technology).

Japanese Laid-Open Patent Application, Publication No. 2009-110152 which is to be referred to as Patent Document 1 hereinafter discloses, under a subhead "Means for Solving the Problems", that "The congestion estimation device includes a motion information generating part 13 for calculating motion information, from an image sequence of an image generating part 11, a texture information generating part 15 for generating texture information of the image, a reference motion information generating part 14 for holding and updating reference motion information serving as a reference of motion, a reference texture information generating part 16 for holding and updating reference texture information for determining the presence of the person, a motion information determining part 18 for determining the presence of the motion, a texture information determining part 19 for determining the presence of texture information same to the person, and a stay determination part 20 for determining the existence of the person by receiving determination results of the motion information and the texture information, various states of every individual area is determined using the determination of a similarity using the presence of the motion and a texture, and the degree of congestion is thereby estimated to provide an index of a congestion state and information of the presence of an abnormal state."

RELATED ART DOCUMENT

Patent Document

Patent Document 1: Japanese Laid-Open Patent Application, Publication No. 2009-110152

SUMMARY OF THE INVENTION

Problem to be Solved by the Invention

The term "congestion" used herein means a jam with a large number of people getting together. When there is congestion at a station or the like, not only a simple getting together of a large number of people but also an associated difficulty in people's moving around is problematic. There is thus a need for determining how much congestion such a state is in terms of a congestion degree.

Patent Document 1 discloses that a state of such an area is outputted as a jam-up area, a moving area, a noise area, and a foreground area. A congestion determination unit can perform a congestion estimation processing with computation on congestion for each type of the areas. Patent Document 1 also discloses that a total congestion degree is computed using: a value calculated by adding up the number of the moving areas and the number of the jam-up areas; a ratio of the jam-up areas; and a ratio of the moving areas.

Patent Document 1 discloses a determination on existence/non-existence of people performed by the texture information determination unit, but does not refer to the number of people per unit area. Generally, however, even when the moving area or the jam-up area exists, if the number of people per unit area is small, such a state is not referred to as a congestion.

In light of the problem, the present invention has been made in an attempt to provide a congestion analysis device, a congestion analysis method, and a congestion analysis program, each of which can appropriately determine a congestion in an area.

Means for Solving the Problem

A congestion state visualization device includes a processor that is configured to: photograph a moving image of a prescribed area, and detect a moving direction of a person therein from the moving image; create a human-shaped icon indicating a moving direction of a person, in accordance with the moving direction of the person; and create a congestion image which is obtained by superimposing the human-shaped icon on a previously-prepared background image in which the prescribed area is photographed, but the person is not photographed.

Other means will be explained in an embodiment for carrying out the present invention.

Advantageous Effects of the Invention

A congestion analysis device, a congestion analysis method, and a congestion analysis program of the present invention make it possible to appropriately determine how is congestion in an area.

BRIEF DESCRIPTION OF THE DRAWINGS

FIG. 13 is a diagram illustrating an icon indicating a moving state of a person and an icon indicating a standing-still state thereof.

FIG. 15 is a diagram illustrating an icon indicating a moving state of a person and an icon indicating a standing-still state thereof according to another variation of the present invention.

EMBODIMENT FOR CARRYING OUT THE INVENTION

Below is described in detail an embodiment for carrying out the present invention with reference to related drawings and formulas.

Figure 1:
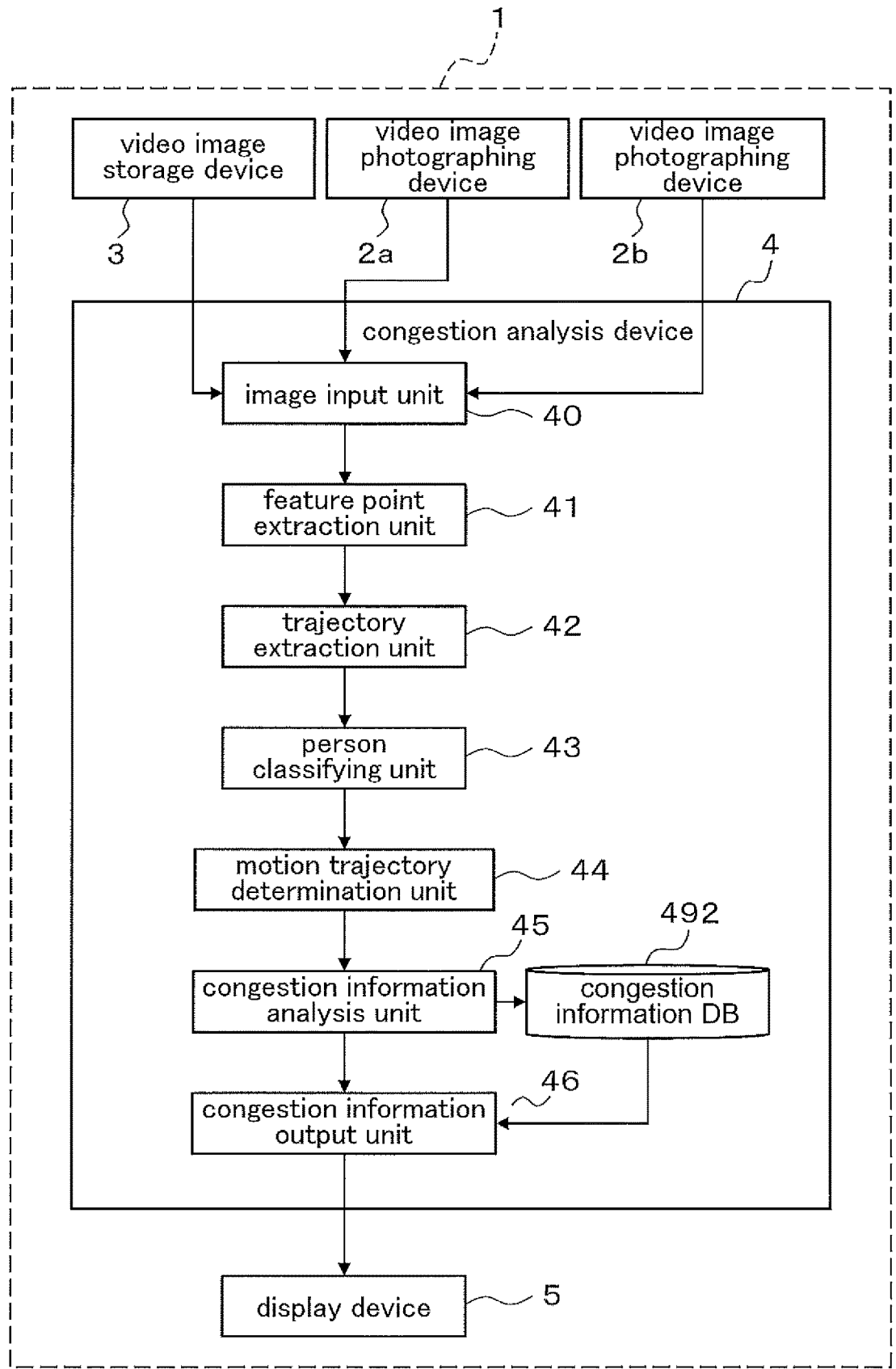
FIG. 1 is a block diagram illustrating a logical configuration of a congestion analysis system.

FIG. 1 is a block diagram illustrating a logical configuration of a congestion analysis system 1.

The congestion analysis system 1 includes: video image photographing devices 2a, 2b and/or a video image storage device 3; a congestion analysis device 4; and a display device 5.

The video image photographing devices 2a, 2b each: are, for example, an analog camera, an IP camera, or the like installed in a prescribed area such as a station; photographs a moving image; and outputs the photographed moving image to the congestion analysis device 4. The video image photographing devices 2a, 2b may be collectively referred to as the video image photographing device 2 hereinafter, unless it is especially necessary to distinguish one from the other. The video image storage device 3: stores therein the photographed moving image; and outputs the stored moving image to the congestion analysis device 4. Any number of units of the video image photographing devices 2a, 2b and/or the video image storage device 3 may be used.

The display device 5 is, for example, a mobile terminal carried by a passenger who uses a station at which the video image photographing devices 2a, 2b are installed, or may be a simple monitor display.

The congestion analysis device 4 analyzes a congestion state using a moving image photographed at a station or the like. The congestion analysis device 4 includes an image input unit 40, a feature point extraction unit 41, a trajectory extraction unit 42, a person classifying unit 43, a motion trajectory determination unit 44, a congestion information analysis unit 45, a congestion information output unit 46, and a congestion information database 492.

The image input unit 40 acquires a moving image of an area of interest photographed by an analog camera or an IP (Internet Protocol) camera. In acquiring the moving image from the analog camera, the image input unit 40 captures an analog signal of the image and converts the analog signal into a digital signal. In acquiring the moving image from the IP camera, the image input unit 40 receives a moving image stream via an IP network.

The feature point extraction unit 41 extracts a feature portion such as an edge, a corner, or the like in each of frames constituting the moving image. The trajectory extraction unit 42: traces the feature point extracted by the feature point extraction unit 41, across a plurality of the frames; and extracts a trajectory from the same feature point in the frames.

The person classifying unit 43: divides the trajectories extracted by the trajectory extraction unit 42 into groups based on similarity; and thereby classifies the trajectories by persons. The person classifying unit 43 then determines the number of the persons present in the area, using the classified trajectories.

The motion trajectory determination unit 44: calculates a center of gravity of each of the persons based on the trajectory of the feature points classified by the person classifying unit 43; and determines a motion trajectory of the each of the persons, using a trajectory of the center of gravity thereof. The image input unit 40, the feature point extraction unit 41, the trajectory extraction unit 42, the person classifying unit 43, and the motion trajectory determination unit 44 collectively function as a trajectory determination unit that determines the number of persons and a motion trajectory of each of the persons, using a moving image in which the persons are photographed. Note that the above configuration of the present invention is not limited to this embodiment, and any other configuration can be used as long as the number of persons in a given area and a motion trajectory of each of the persons can be determined based on a moving image of the area.

The congestion information analysis unit 45: determines the number of the persons and a state of each of the persons; and also determines a congestion degree in the area, based on the number and the state. The congestion information analysis unit 45 also: creates an image on congestion or a heat map; and counts the number of people passing thereby.

The congestion information database 492 stores therein information of various types used by the congestion information analysis unit 45, information of various types outputted by the congestion information analysis unit 45, or the like. In the related drawings, the congestion information database 492 may also be illustrated as the "congestion information DB" in an abbreviated manner.

The congestion information output unit 46: distributes (outputs) a congestion state image or a heat map which shows a result determined by the congestion information analysis unit 45; and also distributes (outputs) a congestion degree determined by the congestion information analysis unit 45. The congestion information output unit 46 may output the congestion degree directly into the display device 5 or may distribute the congestion degree via a server or the like to the display device 5.

Figure 2:
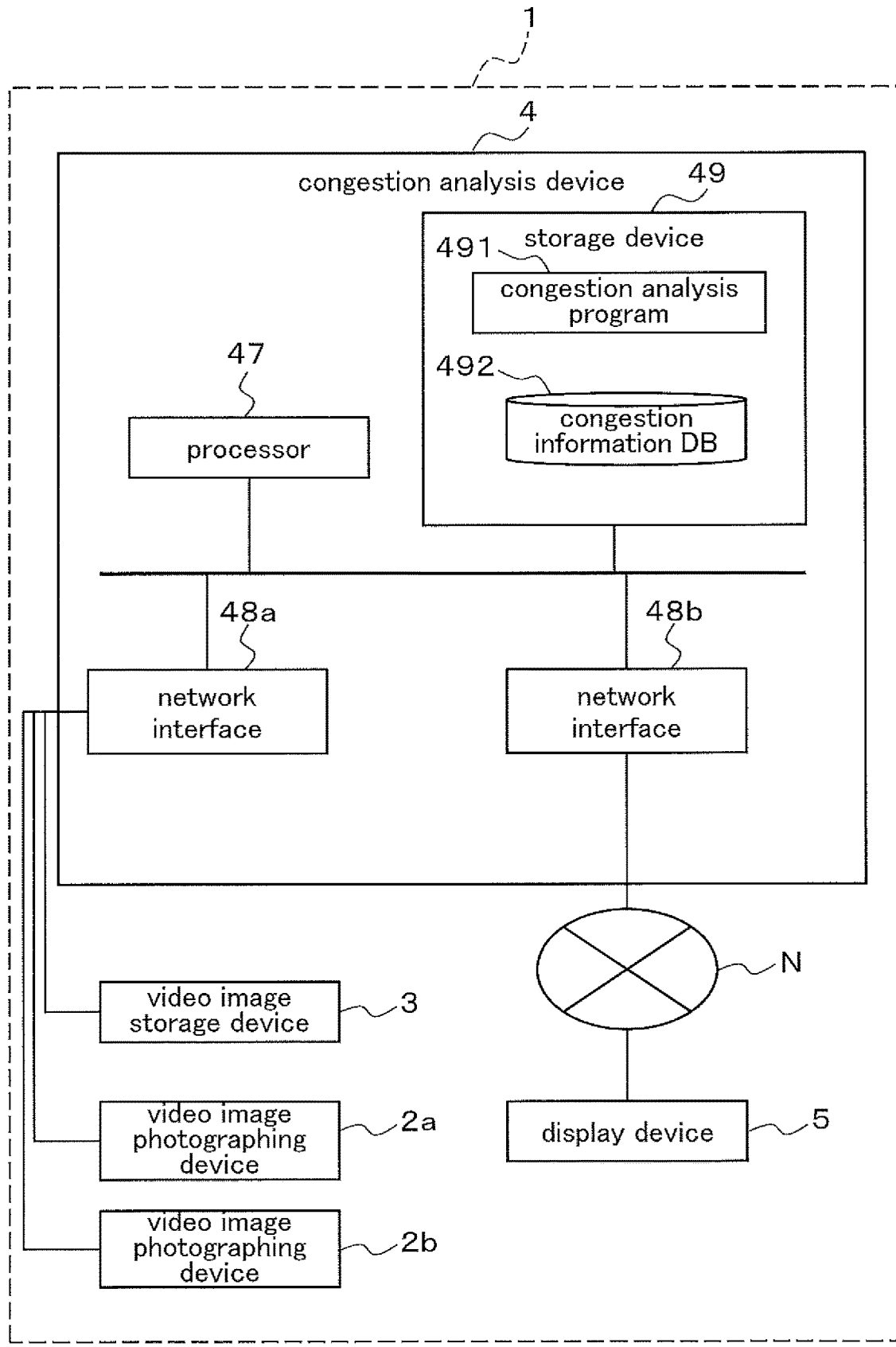
FIG. 2 is a block diagram illustrating a hardware configuration of the congestion analysis system.

FIG. 2 is a block diagram illustrating a hardware configuration of the congestion analysis system 1.

The congestion analysis system 1 further includes a network N in addition to, similarly to FIG. 1, the video image photographing devices 2a, 2b and/or the video image storage device 3, the congestion analysis device 4, and the display device 5. The network N: communicably couples the display device 5 with the congestion analysis device 4; and is, for example, a carrier network.

The congestion analysis device 4: is, for example, a server computer; and includes a processor 47, network interfaces 48a, 48b, and a storage device 49. The processor 47, the network interfaces 48a, 48b, and the storage device 49 are coupled with each other via a bus.

The storage device 49: is, for example, a HDD (Hard Disk Drive) or a flash memory; and stores therein a congestion analysis program 491 and a congestion information database 492. Alternatively, the storage device 49 may be a combination of a medium reader and a medium.

The network interface 48a is an interface that communicably couples the video image photographing devices 2a, 2b and/or the video image storage device 3 with the congestion analysis device 4. The network interface 48b is an interface that communicably couples the display device 5 with the congestion analysis device 4.

The processor 47 includes, for example, a CPU (Central Processing Unit), a ROM (Read Only Memory), and a RAM (Random Access Memory). Upon execution of the congestion analysis program 491 by the processor 47, the image input unit 40, the feature point extraction unit 41, the trajectory extraction unit 42, the person classifying unit 43, the motion trajectory determination unit 44, the congestion information analysis unit 45, and the congestion information output unit 46 (see FIG. 1) are realized.

Figure 3:
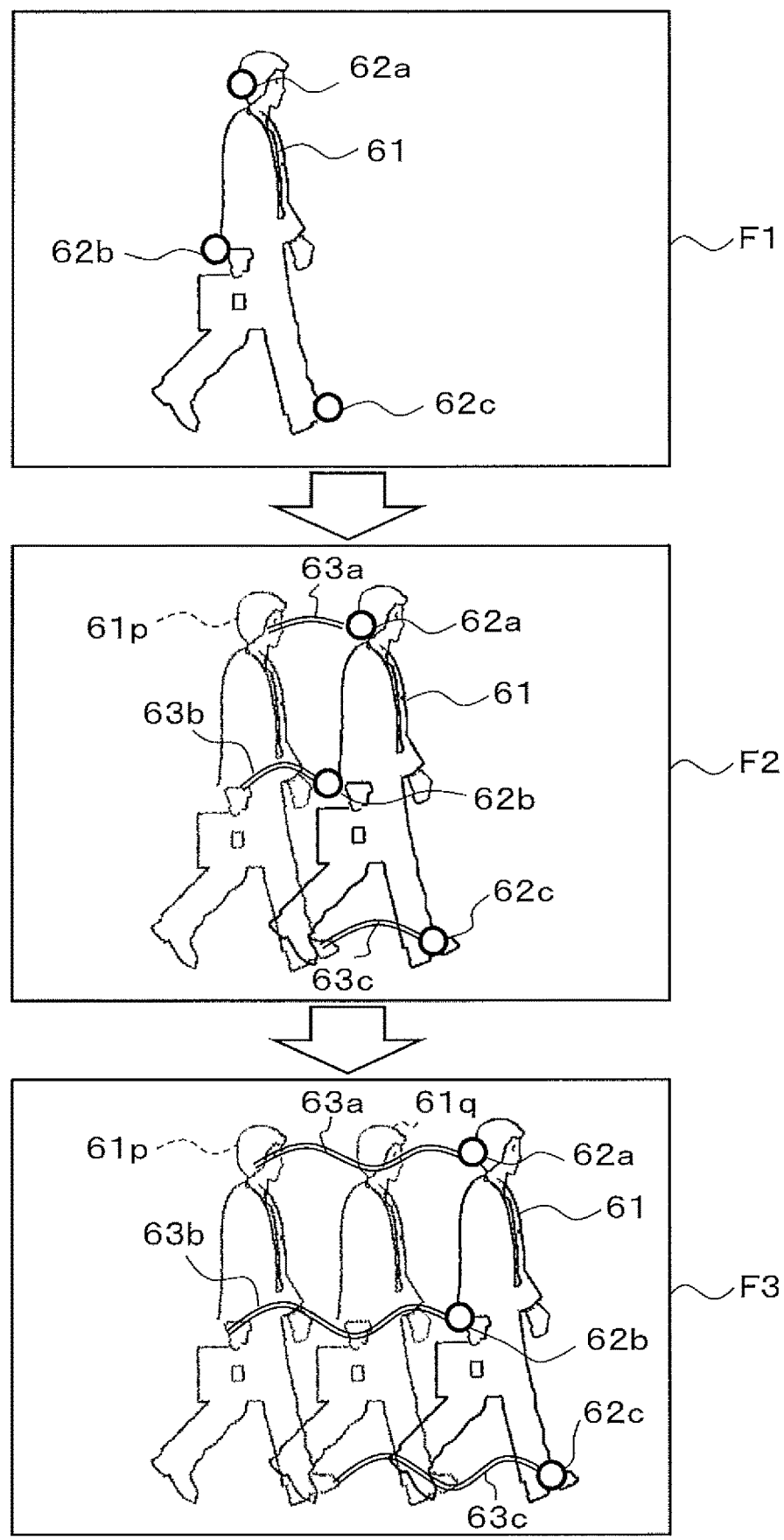
FIG. 3 is a diagram explaining a feature point extraction and a trajectory extraction in performing an image analysis.

FIG. 3 is a diagram explaining a feature point extraction and a trajectory extraction in performing an image analysis.

Frames F1 to F3 in FIG. 3 have respective time axes different from each other. The frame F1 has the time axis at time t; the frame F2, at a time (t+1), which is photographed next to the frame F1; and the frame F3, at a time (t+2), which is photographed next to the frame F2.

The frame F1 displays a photographed person 61 in solid line. The frame F1 also displays feature points 62a to 62c concerning the person 61 extracted by the feature point extraction unit 41. The feature points 62a to 62c may be collectively referred to as the feature point 62 hereinafter, unless it is especially necessary to distinguish from each other.

The frame F2 displays the person 61 in solid line and also displays a person 61p present in the frame F1 in thin line. The frame F2 also displays the feature points 62a to 62c concerning the person 61 extracted by the feature point extraction unit 41. Trajectories 63a to 63c extracted by the trajectory extraction unit 42 are drawn on respective left sides of the feature points 62a to 62c. The trajectories 63a to 63c may be collectively referred to as the trajectory 63 hereinafter, unless it is especially necessary to distinguish from each other.

The trajectories 63a to 63c can be drawn based on the feature points 62a to 62c at the time (t+1) and the feature points 62a to 62c at the time t. When the trajectory 63 is drawn starting from the feature point 62, for example, a Lucas-Kanade method may be used. Alternatively, a particle filter or a Kalman filter may be used without specific limitation.

The frame F3 displays the person 61 in solid line; the person 61p in the frame F1 in thin line; and a person 61q in the frame F2 also in thin line. The frame F3 displays the feature points 62a to 62c concerning the person 61 extracted by the feature point extraction unit 41. The trajectories 63a to 63c extracted by the trajectory extraction unit 42 are drawn on respective left sides of the feature points 62a to 62c. The trajectories 63a to 63c can be drawn based on the feature points 62a to 62c at the time (t+2) and the feature points 62a to 62c at the time (t+1). Similar steps are then repeated, and a motion trajectory of each of the feature points can be obtained.

Figure 4:
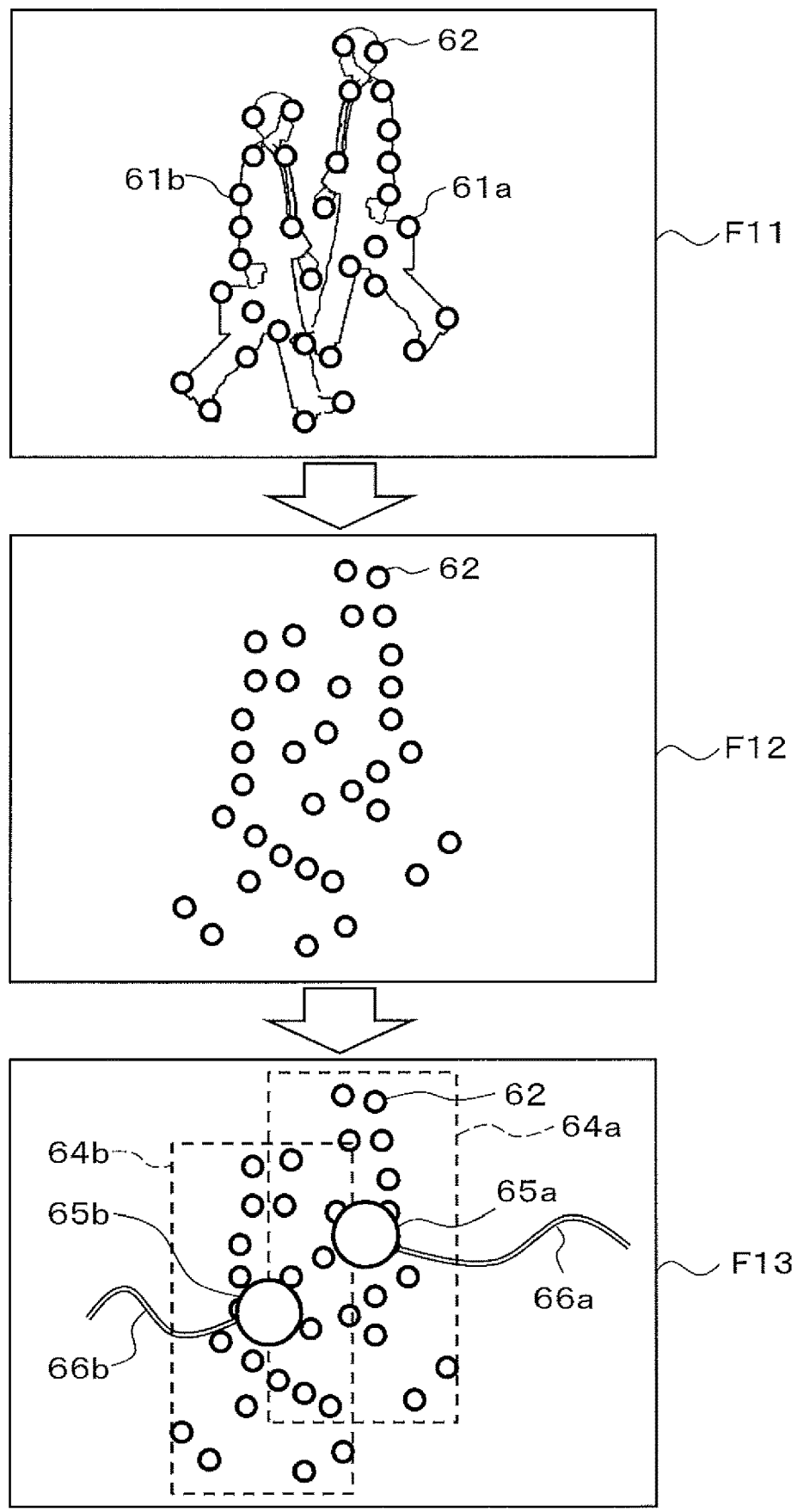
FIG. 4 is diagram explaining how to classify persons and how to determine respective motion trajectories thereof in performing the image analysis.

FIG. 4 is a diagram explaining how to classify persons and how to determine respective motion trajectories thereof in performing the image analysis.

Frames F11 to F13 in FIG. 4 each illustrate a frame at a time (t+N). The frame F11 displays the feature point 62 concerning each of the persons 61a, 61b.

The frame F12 displays only the feature point 62. The person classifying unit 43 classifies the feature point 62 by clustering using information on current and previous positions. The frame F13 displays a result of classifying the feature point 62.

The frame F13 displays the feature point 62 and person-representing rectangle 64a, 64b, each of the latter is a circumscribed rectangle of the feature point 62 classified by the person classifying unit 43. The frame F13 also displays: respective centers of gravity 65a, 65b of the persons 61a, 61b, of the classified feature point 62; and respective person motion trajectories 66a, 66b determined by respective trajectories of the centers of gravity 65a, 65b. The motion trajectory determination unit 44: determines person-representing rectangles 64a, 64b, each of which is a circumscribed rectangle of the feature point 62 classified by the person classifying unit 43; and also determines the respective centers of gravity 65a, 65b based on the feature point 62 of the persons 61a, 61b. The motion trajectory determination unit 44 further determines person motion trajectories 66a, 66b based on the respective trajectories of the centers of gravity 65a, 65b. The person motion trajectories 66a, 66b may be collectively referred to as the person motion trajectory 66 hereinafter, unless it is especially necessary to distinguish one from the other.

Figure 5:
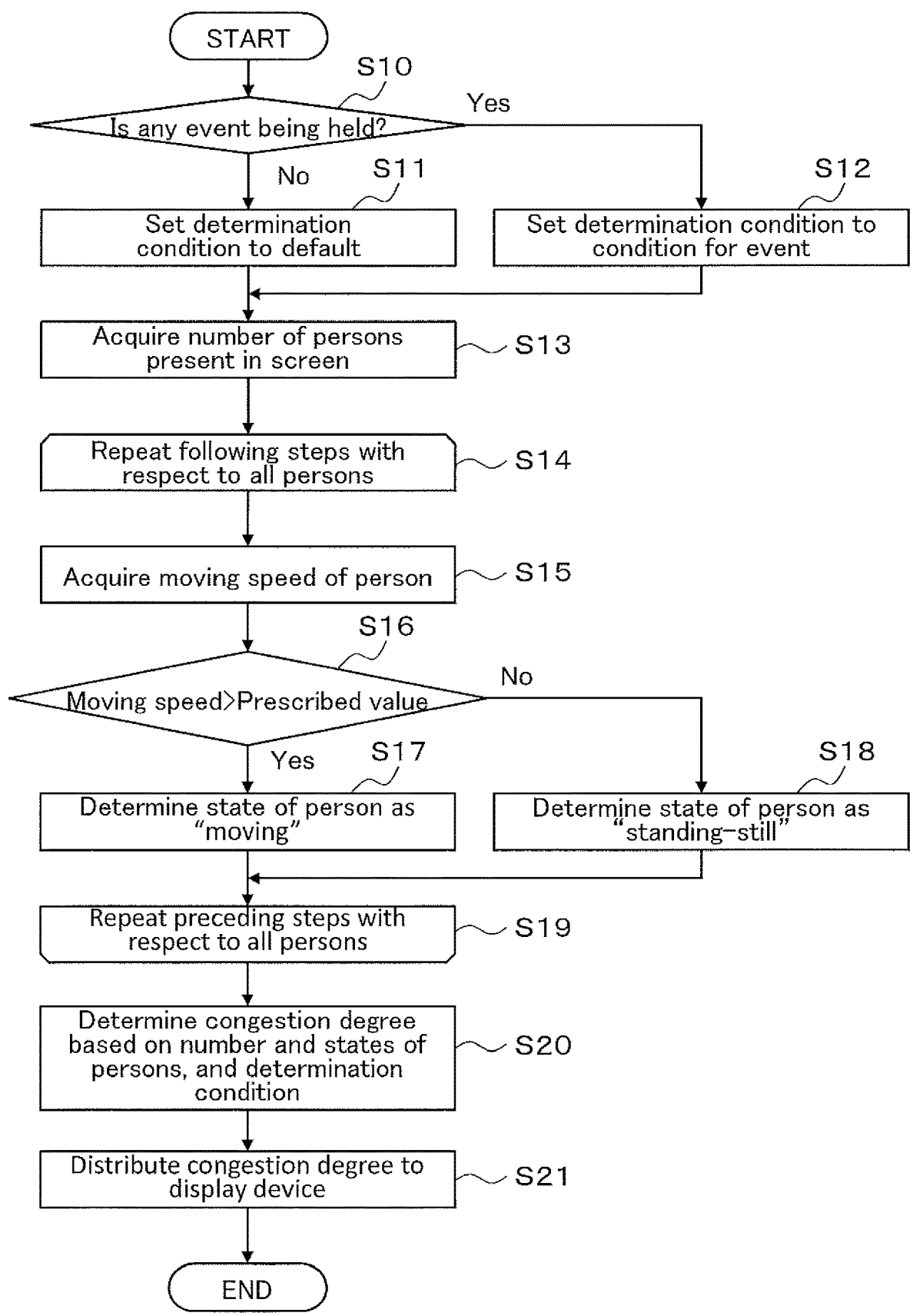
FIG. 5 is a flowchart illustrating a method of determining and distributing a congestion degree.

FIG. 5 is a flowchart illustrating a method of determining and distributing a congestion degree.

The congestion information analysis unit 45 (see FIG. 1) determines, as a start, whether or not any event is now being held at a given station (step S10). If any event is now being held there, the congestion information analysis unit 45 sets a determination condition to a condition for event (step S12). If no event is now being held, the congestion information analysis unit 45 sets the determination condition to a default (step S11). The determination condition is used in step S20 to be described hereinafter.

The configuration described above makes it possible for the congestion information analysis unit 45 to determine, based on a generally-estimated congestion when such an event is being held, whether or not there is still more congestion.

The person classifying unit 43 (see FIG. 1) then acquires the number of persons present in a screen (a frame) constituting a moving image (step S13). The congestion information analysis unit 45 repeats steps S14 to S19 with respect to each of the persons on the screen.

The congestion information analysis unit 45 acquires a moving speed of the person of interest in the screen (step S15). The moving speed of the person is determined based on the person motion trajectory 66 (see FIG. 4) which has been determined by the motion trajectory determination unit 44 (see FIG. 1).

The congestion information analysis unit 45 determines whether or not the moving speed of the person is larger than a prescribed value (step S16). If the moving speed of the person is larger than the prescribed value, the congestion information analysis unit 45 determines a state of the person as "moving" (step S17). If the moving speed of the person is not larger than the prescribed value, the congestion information analysis unit 45 determines the state of the person as "standing-still" (step S18).

After repeating steps S14 to S19 with respect to each of the persons in the screen, the congestion information analysis unit 45 determines a congestion degree based on the number of the persons, the states, and the determination condition (step S20). Details of the determination condition will be explained with reference to FIG. 6 to FIG. 9 to be described hereinafter.

The congestion information output unit 46: distributes (outputs) the determined congestion degree to the display device 5 (see FIG. 1) (step S21); and thereby terminates the processing of FIG. 5.

The congestion degree distributed to the display device 5 makes it possible for a user thereof to suitably know a congestion state of a station of interest.

The congestion degree is directed to an area of interest photographed by one unit of the video image photographing device 2. Meanwhile, the congestion information analysis unit 45 may calculate an average of congestion degrees of all areas photographed by a plurality of the video image photographing devices 2 installed at a station, to thereby obtain a congestion degree of the entire station. The congestion information analysis unit 45 may also calculate a congestion degree at a specific moment or an average congestion degree during a prescribed period of time. The congestion information analysis unit 45 may calculate a congestion degree of only a part of an area photographed by one unit of the video image photographing device 2.

Figure 6:
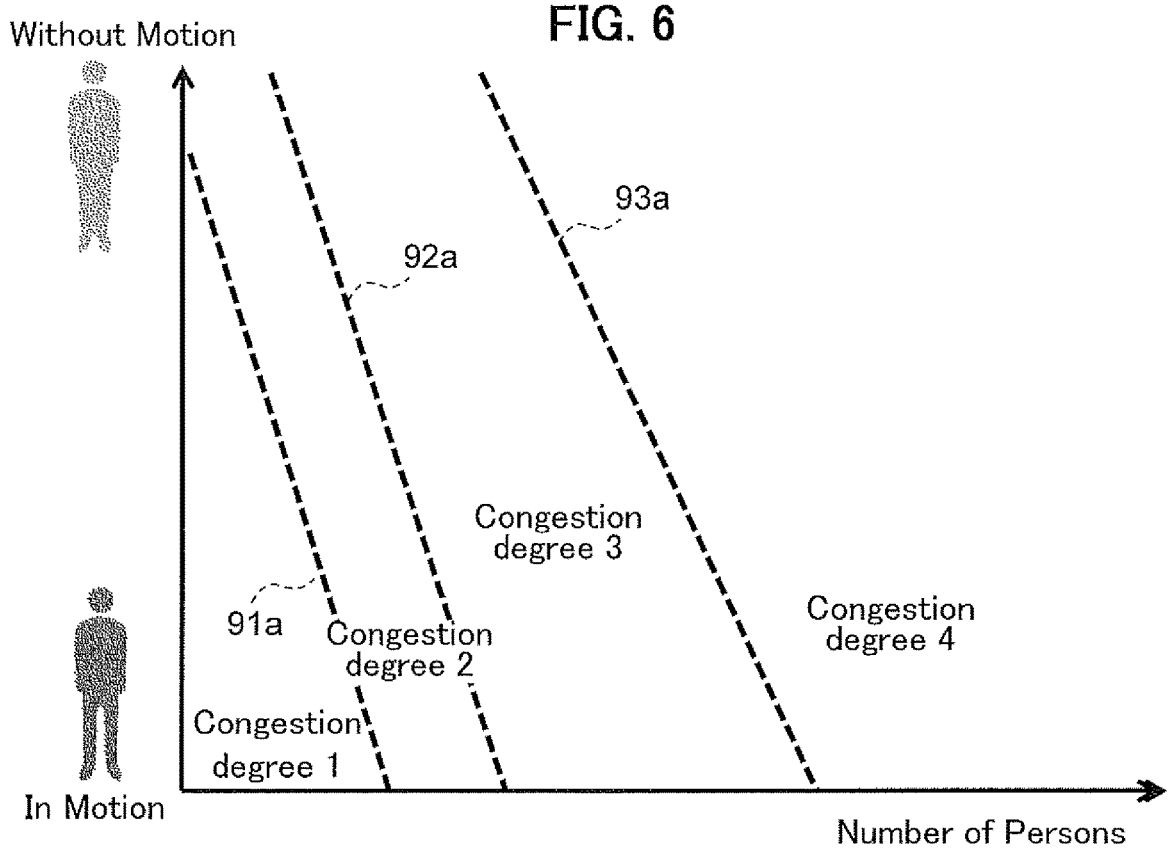
FIG. 6 is a graph illustrating a first determination condition of the congestion degree as a default.

FIG. 6 is a graph illustrating a first determination condition on a congestion degree as a default.

Each of FIG. 6 to FIG. 9 below has: the number of people present in a prescribed area, for example, the number of persons in a screen, on the abscissa; and a state of the persons present in the prescribed area, for example, a ratio of the number of the persons in the moving state and the number of the persons in the standing-still state, on the ordinate.

The congestion degree is determined by the number of persons and the state of each of the persons. The larger the number of the persons, the higher the congestion degree. Even with the same number of the persons, if the ratio of the number of the persons in the standing-still state is high, the congestion degree becomes high. This is because the high ratio of the number of the persons in the moving state means that the people can move freely, which is not be referred to as a high congestion degree.

In the first determination condition of the congestion degree, a congestion degree 1 represents a state in which a state value y is smaller than a value obtained by a formula (1) shown below. A boundary line 91a corresponds to the formula (1), and is a boundary between the congestion degree 1 and a congestion degree 2. The congestion degree 1 shows that the number of persons is small and there is no jam-up of the people.

[Formula 1]

$$y = -a_1 x + b_1 \quad (1)$$

wherein y: a value of a state, x: the number of persons, $a_1 > 0$, and $b_1 >$ constant.

In this embodiment, the congestion degree is indicated by numerical numbers from 1 to 4. The congestion degree 1 represents a state of the lowest congestion degree.

The congestion degree 2 represents a state in which the state value y is smaller than the formula (2) shown below, and, at the same time, is equal to or larger than the formula (1). A boundary line 92a corresponds to the formula (2), and is a boundary between the congestion degree 2 and the congestion degree 3. The congestion degree 2 shows that the number of people is small and there is not so much jam-up.

[Formula 2]

$$y = -a_2 x + b_2 \quad (2)$$

wherein, $a_2 > a_1$, and $b_2 > b_1$.

The congestion degree 3 represents a state in which the state value y is smaller than the formula (3) shown below, and, at the same time, is equal to or larger than the formula (2). A boundary line 93a corresponds to the formula (3), and is a boundary between the congestion degree 3 and the congestion degree 4. The congestion degree 3 shows that there is jam-up though the number of people is small, or the number of people is rather large though there is no jam-up.

[Formula 3]

$$y = -a_3 x + b_3 \quad (3)$$

wherein, $a_3 > a_2$, and $b_3 > b_2$.

The congestion degree 4 represents a state in which the state value y is equal to or larger than the formula (3). The congestion degree 4 shows that the number of people is large, or there is jam-up.

Figure 7:
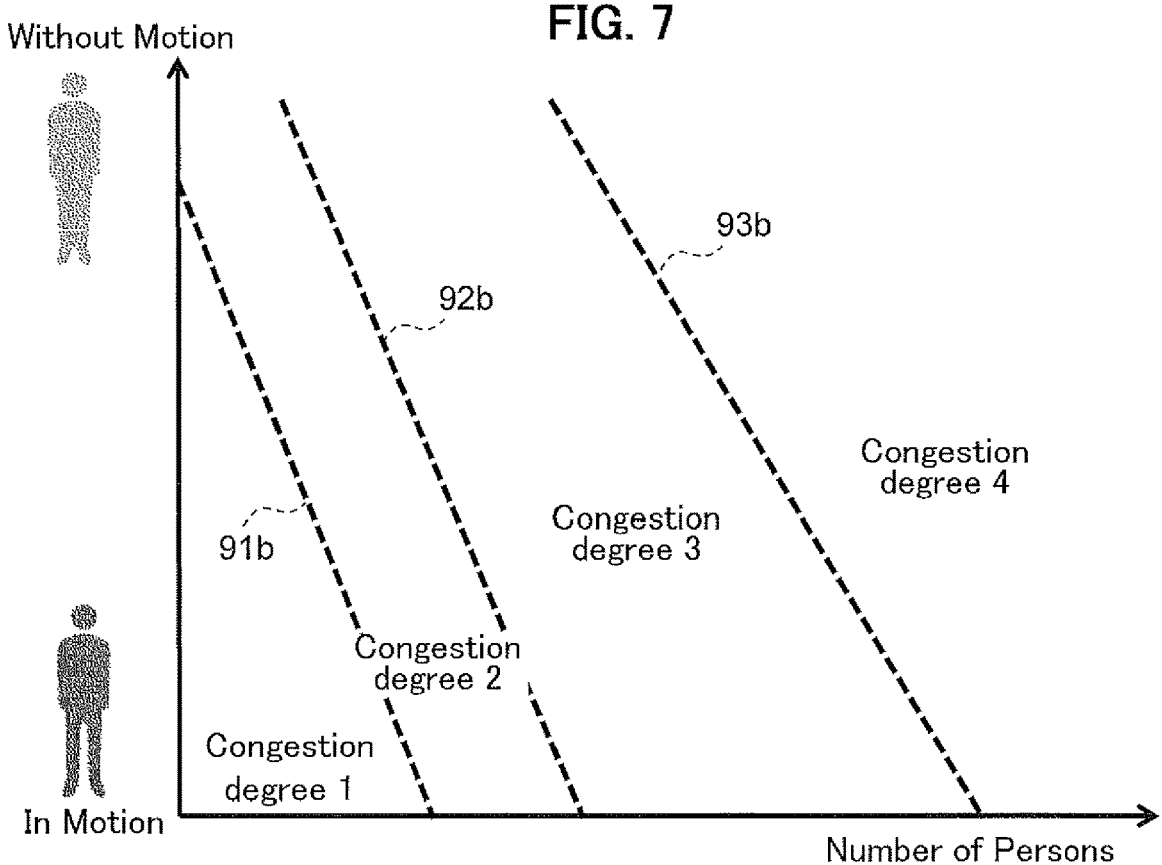
FIG. 7 is a graph illustrating a second determination condition of the congestion degree used when an event is being held.

FIG. 7 is a graph illustrating a second determination condition of the congestion degree when an event is being held.

When an event is being held, a boundary line 91b is situated in an upper right than the boundary line 91a. A boundary line 92b is situated in an upper right than the boundary line 92a. A boundary line 93b is situated in an upper right than the boundary line 93a. The determination configuration described above makes it possible to determine, based on a generally estimated congestion when an event is being held, whether or not there is still more congestion.

In the first and the second determination conditions, the boundaries of the congestion degrees can be calculated using only additions and multiplications. This can reduce computational load.

Figure 8:
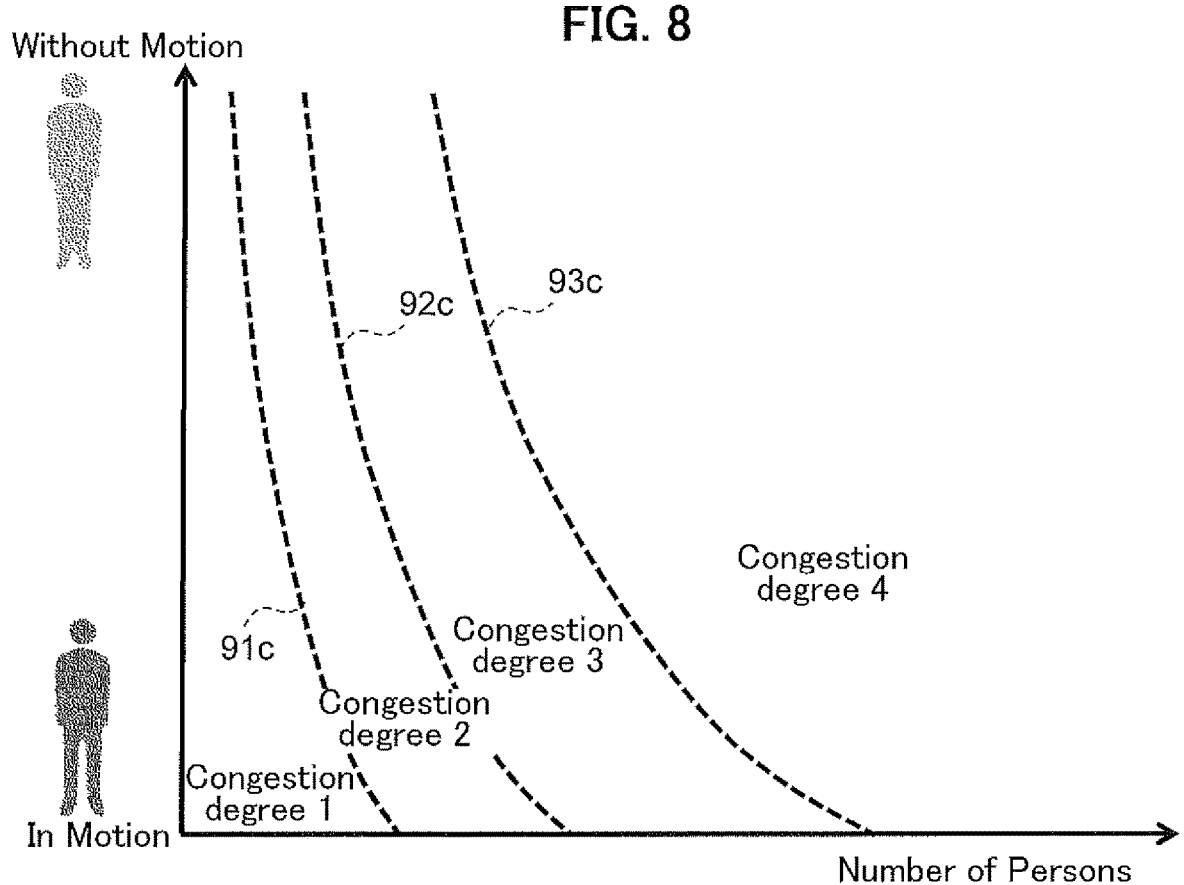
FIG. 8 is a graph illustrating a third determination condition of the congestion degree.

FIG. 8 is a graph illustrating a third determination condition of the congestion degree.

In the third determination condition of the congestion degree, a congestion degree 1 represents a state in which the state value y is smaller than the formula (4) shown below. A boundary line 91c corresponds to the formula (4), and is a boundary between the congestion degree 1 and the congestion degree 2.

[Formula 4]

$$y = \frac{a_1}{x} - b_1 \quad (4)$$

wherein, $0 < a_1$, and $$0 < \frac{b_1}{a_1}$$

The congestion degree 2 represents a state in which the state value y is smaller than a formula (5) below, and, at the same time, is equal to or larger than the formula (4). A boundary line 92c corresponds to the formula (5), and is a boundary between the congestion degree 2 and the congestion degree 3.

[Formula 5]

$$y = \frac{a_2}{x} - b_2 \quad (5)$$

wherein, $a_1 < a_2$, and $$\frac{b_1}{a_1} < \frac{b_2}{a_2}$$

The congestion degree 3 represents a state in which the state value y is smaller than the formula (6) shown below, and, at the same time, is equal to or larger than the formula (5). A boundary line 93c corresponds to the formula (6), and is a boundary between the congestion degree 3 and the congestion degree 4.

[Formula 6]

$$y = \frac{a_3}{x} - b_3 \quad (6)$$

wherein, $a_2 < a_3$, and $$\frac{b_2}{a_2} < \frac{b_3}{a_3}$$

The congestion degree 4 represents a state in which the state value y is equal to or larger than the formula (6).

In any of the first to the third determination conditions of the congestion degree, it is determined that: the larger the number of people, the higher the congestion degree; and the higher the ratio of the people in the standing-still state, the higher the congestion degree. As described above, the congestion degree is determined in accordance with the number of the people and a state of each of the people, thus allowing a useful, close to human sense determination of the congestion degree to be made.

Figure 9:
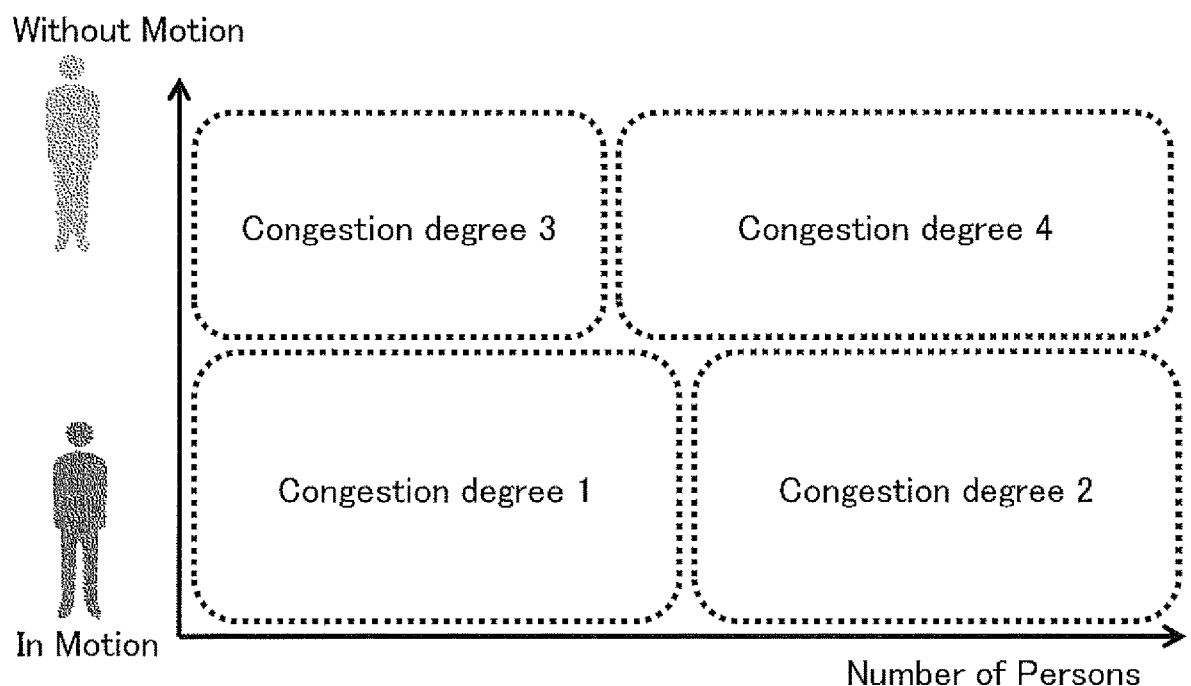
FIG. 9 is a graph illustrating a fourth determination condition of the congestion degree.

FIG. 9 is a graph illustrating a fourth determination condition of the congestion degree.

In the fourth determination condition of the congestion degree, the congestion degree 1 represents a state in which the state value y is smaller than a prescribed state threshold, and, at the same time, is smaller than the number of people x.

The congestion degree 2 represents a state in which the state value y is smaller than the state threshold, and, at the same time, the number of people x is equal to or larger than a first threshold.

The congestion degree 3 represents a state in which the state value y is equal to or larger than the state threshold, and, at the same time, the number of people x is smaller than a second threshold. The congestion degree 4 represents a state in which the state value y is equal to or larger than the state threshold, and, at the same time, the number of people x is equal to or larger than the second threshold. The configuration described above makes it possible to determine a congestion degree more easily than the first to the third determination conditions.

Figure 10:
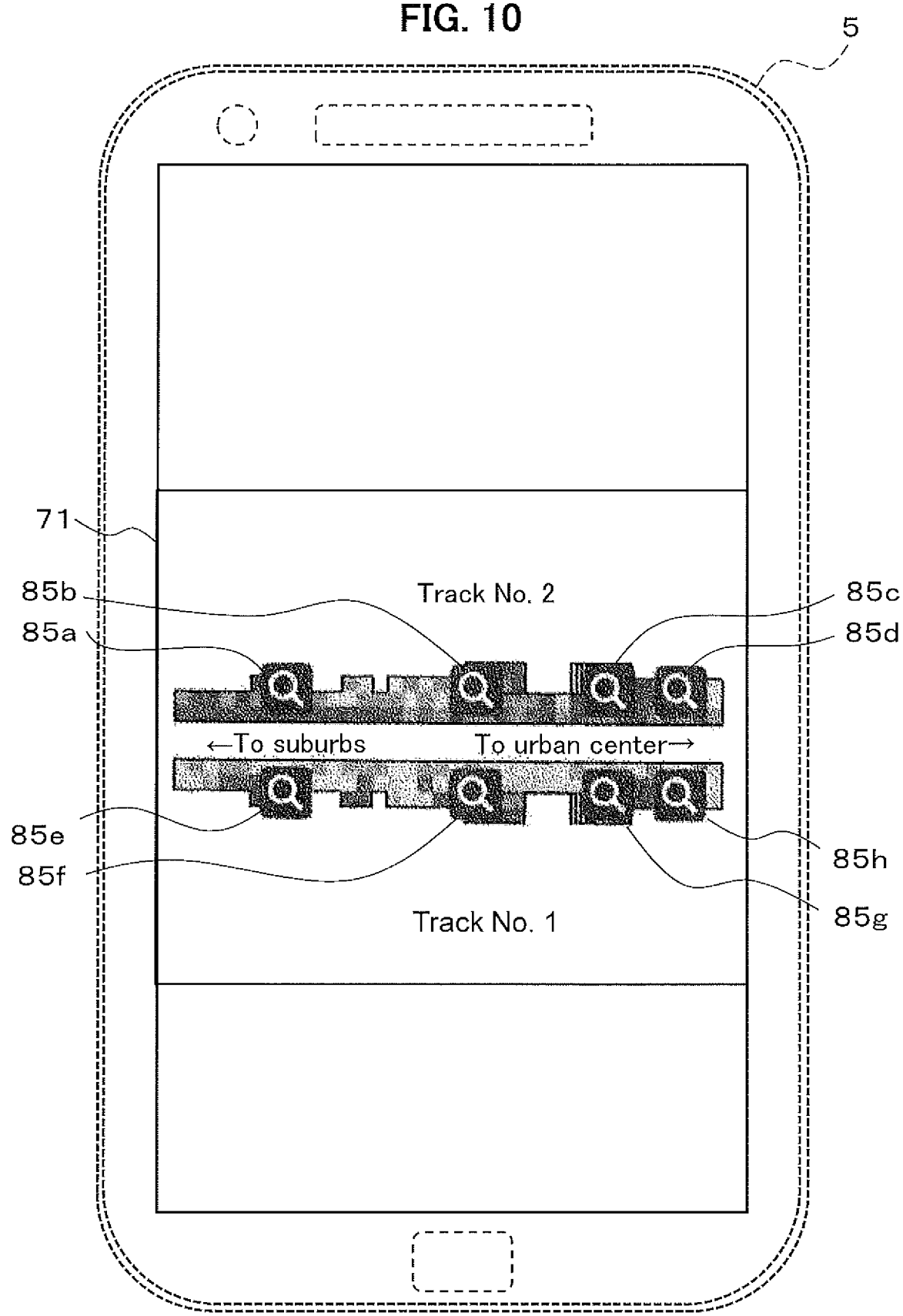
FIG. 10 is a diagram illustrating a heat map distributed to a display device.

FIG. 10 is a diagram illustrating a heat map 71 distributed to the display device 5.

The heat map 71 displayed herein is created by superimposing a congestion degree on a station map using different colors and/or intensities. A user of the display device 5 can easily see a congestion state in a station of interest. Loupe icons 85a to 85h displayed on the heat map 71 represents the respective video image photographing devices 2. When the user taps any one of the loupe icons 85a to 85h, the user can view a congestion image 72 (see FIG. 11) photographed by the corresponding one of the video image photographing devices.

The heat map 71 displayed herein is created by, for example, superimposing a congestion degree calculated in FIG. 5, on each of areas in a station map, using different colors and/or intensities.

Figure 11:
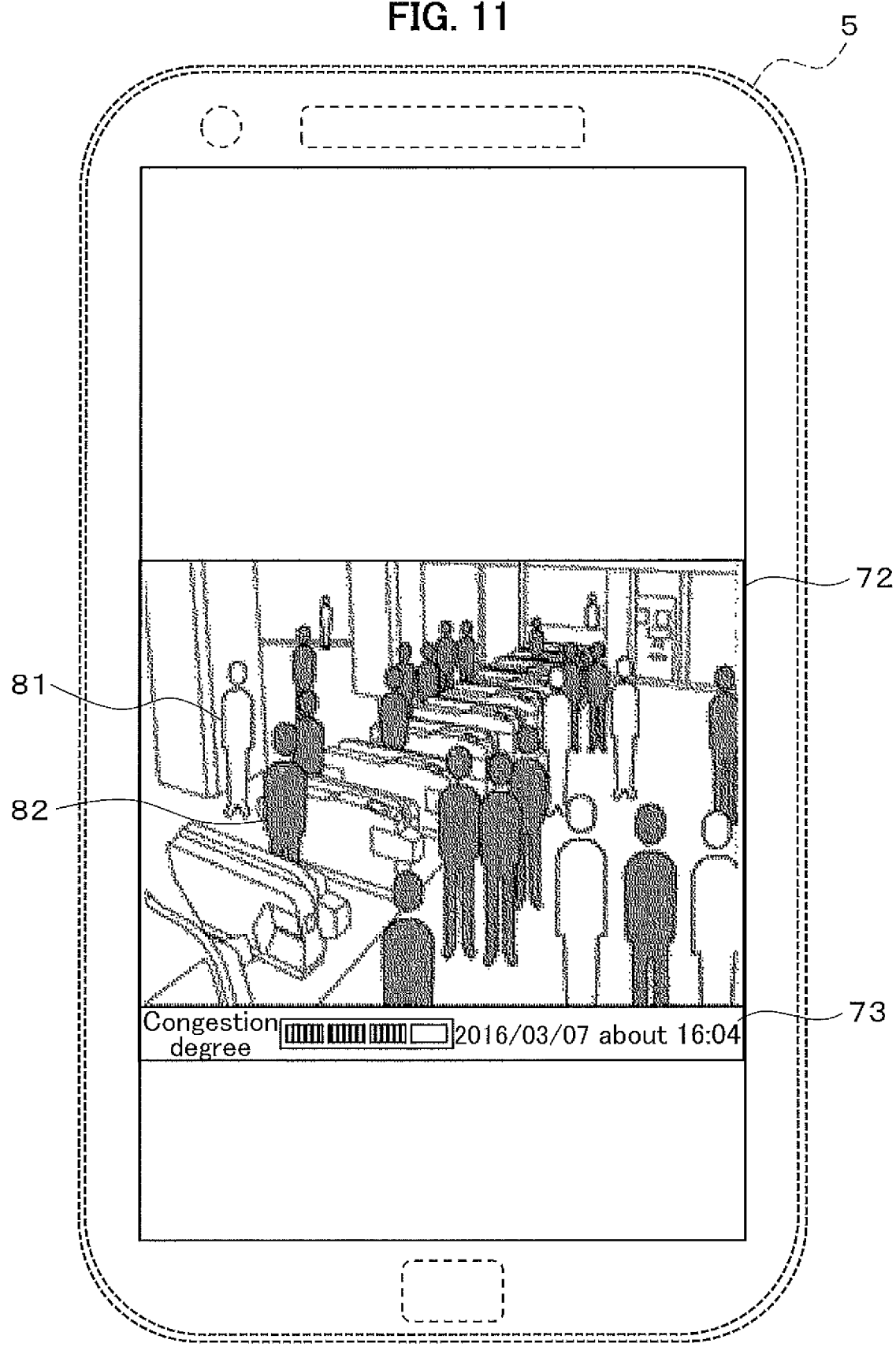
FIG. 11 is a diagram illustrating an image on congestion distributed to the display device.

FIG. 11 is a diagram illustrating the congestion image 72 distributed to the display device 5.

The congestion image 72 is composed of: a background image with no person photographed; and an icon indicating a person which is superimposed on the background image. The congestion image 72 has a plurality of without-motion icons 81 and a plurality of in-motion icons 82 arranged thereon. The congestion analysis device 4 does not distribute a photographed image as it is, which can secure privacy of a photographed person.

The without-motion icon 81 is yellow in color; and the in-motion icon 82, purple. The yellow and the purple makes a combination of colors which almost all of those who even have color vision deficiency such as protanopes and deuteranopes can recognize. A user can intuitively know the congestion degree based on a density of each of and a ratio between the without-motion icons 81 and the in-motion icons 82.

A congestion degree bar 73 is displayed below the congestion image 72. The congestion degree bar 73 displays a bar graph indicating a congestion degree and a time to which the congestion degree refers. This makes it possible for a user to appropriately know a congestion degree at a station of interest.

Figure 12:
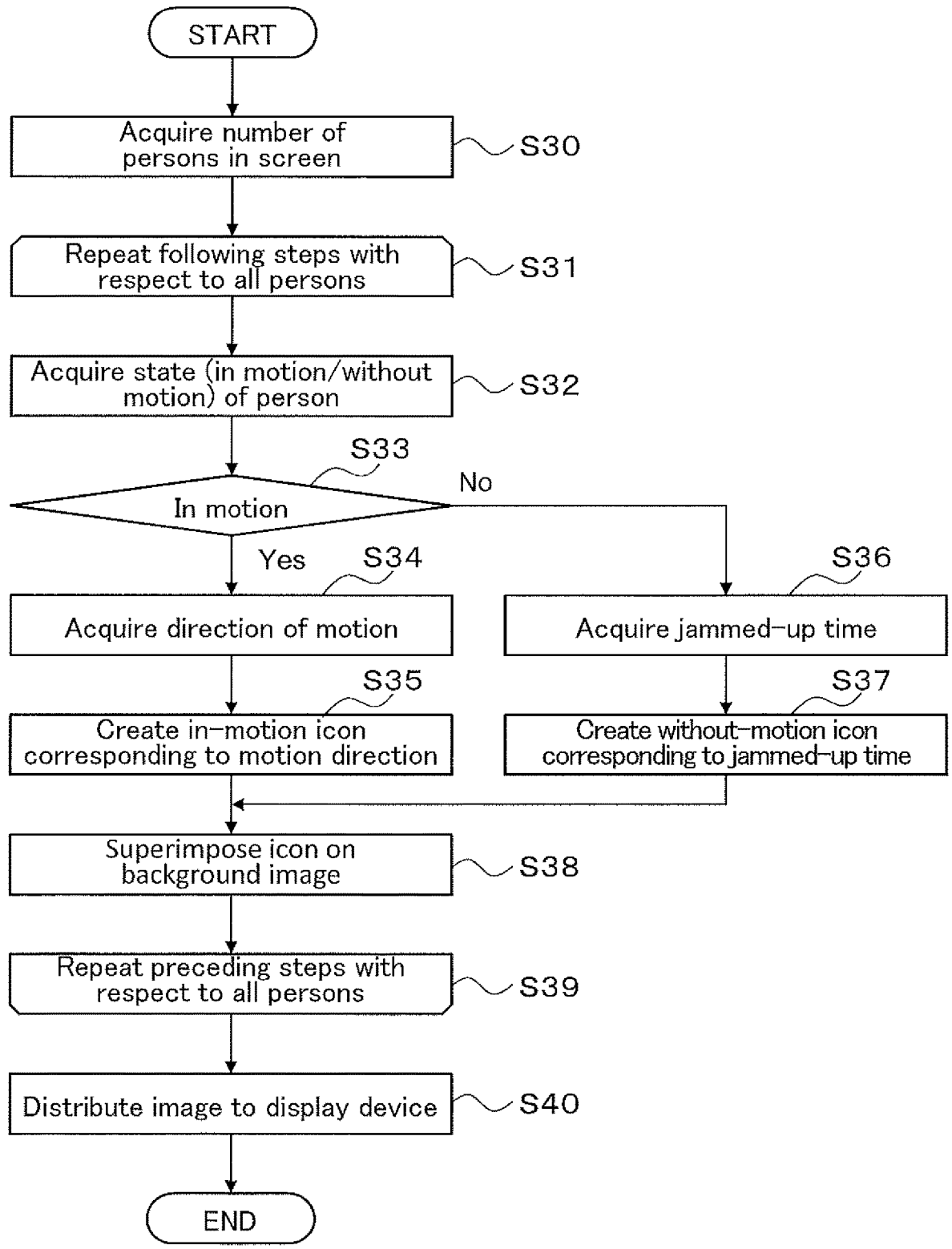
FIG. 12 is a flowchart illustrating a method of creating an image on congestion.

FIG. 12 is flowchart illustrating a method of creating the congestion image 72.

The person classifying unit 43 (see FIG. 1) acquires, as a start, the number of persons present in a screen (a frame) constituting a moving image (step S30). The congestion information analysis unit 45 repeats steps S31 to S39 with respect to each of the persons on the screen.

The congestion information analysis unit 45 acquires either "in motion" or "without motion" as a state of each of the persons (step S32), and determines whether or not the person is in motion (step S33). Note that what is performed in step S32 is same as that in steps S15 to S18 illustrated in FIG. 5.

If a person of interest is in motion, the congestion information analysis unit 45: acquires a direction of the motion (step S34); and creates the in-motion icon 82 corresponding to the motion direction (step S35). If the person is not in motion, the congestion information analysis unit 45: acquires a jammed-up time (step S36); and creates the without-motion icon 81 corresponding to the jammed-up time thereof (step S37).

The congestion information analysis unit 45 superimposes the created icon on the background image (step S38).

The congestion information analysis unit 45 repeats steps S31 to S39 with respect to each of the persons on the screen. The congestion information output unit 46 then: distributes (outputs) the created congestion image 72 (see FIG. 11) to the display device 5 (step S40); and thereby terminates the processing illustrated in FIG. 12. The configuration described above makes it possible for the congestion analysis device 4 to distribute (output) the congestion image 72 (see FIG. 11) to the display device 5 of a user.

Note that the congestion information analysis unit 45 may not only determine either "in motion" or "without motion" as the state of each person, but also determine whether or not the person has baggage. Whether or not the person has baggage can be determined by, for example, collating an image frame with an image database of a suitcase or a carrier bag. Herein, the congestion information analysis unit 45 can add an icon indicating whether or not the person has baggage, to an icon indicating the person. This makes it possible for a user to easily know that there is congestion with people having suitcases, carrier bags, or any other baggage.

When a ratio of people having baggage is high, the congestion information analysis unit 45 may determine the congestion degree to a higher level. This makes it possible for a user to easily know that an area of interest is crowded because space is occupied by the baggage of the people there.

The congestion information analysis unit 45 may further determine an attribute such as a gender and an age of a person as a state thereof. The attribute such as a gender and an age of a person can be determined by, for example, collating a frame image with a face image database. At this time, the congestion information analysis unit 45 may add an icon indicating the attribute such as a gender and an age of a person to an icon indicating the person. This makes it possible for a user to easily know that there is congestion with people having what type of attribute.

When a ratio of people having a specific attribute is high, the congestion information analysis unit 45 may determine a level of the congestion degree with appropriate adjustment. For example, when a ratio of people aged over 14 is high, the congestion degree is determined at a higher level, and, when the ratio of people aged 14 or younger is high, at a lower level.

FIG. 13 illustrates an icon indicating a person in a state in motion and an icon indicating a person in a state without motion.

Those icons each represent an action of a person photographed by the video image photographing device 2 (a camera) installed in a prescribed area. The congestion analysis device 4 displays the icons as described below, each indicating how is a congestion or a jam-up of people in the area photographed by the video image photographing device 2 (the camera).

An in-motion icon 82L is purple in color and is hatched in the figure. The in-motion icon 82L represents a person with his/her feet spread and head turning to a left. This shows that the person is moving to the left.

An in-motion icon 82F is also purple in color, and is hatched in the figure. The in-motion icon 82F represents a person with his/her feet spread and head facing to a front (in a direction from rear to front with respect to the plane of the figure). This shows that the person is moving to the front (in the direction from rear to front with respect to the plane of the figure).

An in-motion icon 82B is also purple in color and is hatched in the figure. The in-motion icon 82B represents a person with his/her feet spread and head facing to a rear (in a direction from front to rear with respect to the plane of the figure). This shows that the person is moving to the rear (in the direction from front to rear with respect to the plane of the figure).

An in-motion icon 82R is also purple in color and is hatched in the figure. The in-motion icon 82R represents a person with his/her feet spread and head turning to a right. This shows that the person is moving to the right.

Without-motion icons 81a, 81b are yellow in color and are drawn in outline in the figure. The without-motion icons 81a, 81b each represent a person with his/her feet put together. This shows that the person is standing still. A jammed-up time icon 83a, inside of a balloon of which displays "3 minutes", is placed above the without-motion icon 81a. A jammed-up time icon 83b, inside of a balloon of which displays "5 minutes", is placed above the without-motion icon 81b. This makes it possible for a user to easily recognize a jammed-up time of each of the persons who are standing still. The jammed-up time icons 83a, 83b may be collectively referred to as the jammed-up time icon 83 hereinafter, unless it is especially necessary to distinguish one from the other.

The balloon shaped jammed-up time icon 83 may be displayed not only above the without-motion icon 81 but also above the in-motion icon 82. Such a variation will be explained in detail with reference to FIG. 14 to FIG. 16 hereinafter.

The in-motion icons 82L, 82F, 82B, 82R are each designed as a person with his/her feet spread. This makes it possible for a user to intuitively know that the person corresponding to the icon is now moving.

In contrast, the without-motion icons 81a, 81b are each designed as a person with his/her feet put together. This makes it possible for a user to intuitively know that the person corresponding to the icon is now standing still.

Figure 14:
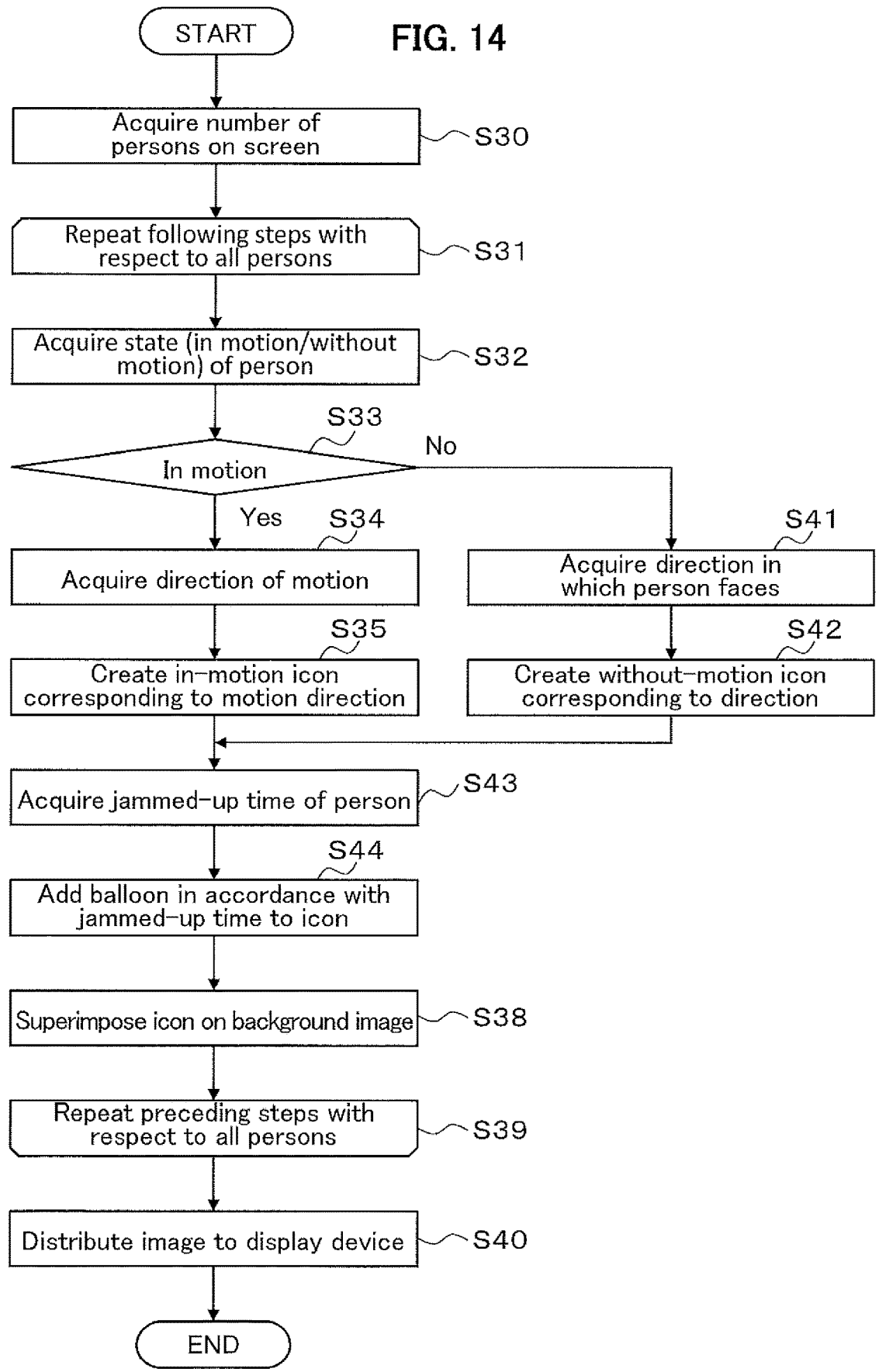
FIG. 14 is a flowchart illustrating a method of creating an image on congestion according to a variation of the present invention.

FIG. 14 is a flowchart illustrating a method of creating the congestion image 72 according to a variation of the present invention.

Steps S30 to S35 are similar to the method of creating the congestion image 72 illustrated in FIG. 12.

In step S33, if a person of interest is not determined to be in a moving state, the congestion information analysis unit 45: acquires a direction in which the person faces (step S41); and creates the without-motion icon 81 corresponding to the acquired direction (step S42). The congestion information analysis unit 45 can determine (acquire) the direction in which the person who is standing still faces by, for example, collating a frame image with an image database containing a direction of a face.

After step S35 or step S42, the congestion information analysis unit 45 further acquires a jammed-up time of the person (step S43); and adds the balloon-shaped jammed-up time icon 83 in accordance with the jammed-up time, to an icon indicating the person (step S44). Step S38 in which the congestion information analysis unit 45 superimposes the created icon on the background image, steps subsequent thereto, and steps S36 and S37, are similar to the method of creating the congestion image 72 illustrated in FIG. 12.

FIG. 15 illustrates icons each indicating a moving state and a standing-still state of a person according to another variation. Those icons each represent an action photographed by the video image photographing device 2 (the camera) installed in a prescribed area. The congestion analysis device 4 displays icons as described below, each indicating how is a congestion or a jam-up of people in an area photographed by the video image photographing device 2 (the camera).

The in-motion icon 82L is purple in color and is hatched in the figure. The in-motion icon 82L represents a person with his/her feet spread and head turning to the left. This shows that the person is moving to the left.

A without-motion icon 81L is yellow in color and is drawn in outline in the figure. The without-motion icon 81L represents a person with his/her feet put together and head facing to the left. This shows that the person is standing still and facing to the left.

The in-motion icon 82F is purple in color, and is hatched in the figure. The in-motion icon 82F represents a person with his/her feet spread and head facing to a front (in the direction from rear to front with respect to the plane of the figure). This shows that the person is moving to the front (in the direction from rear to front with respect to the plane of the figure).

A without-motion icon 81F is yellow in color and is drawn in outline in the figure. The without-motion icon 81F represents a person with his/her feet put together and head facing to the front (in the direction from rear to front with respect to the plane of the figure). This shows that the person is standing still, facing to the front (in the direction from rear to front with respect to the plane of the figure).

An in-motion icon 82B is purple in color and is hatched in the figure. The in-motion icon 82B represents a person with his/her feet spread and head facing to the rear (in the direction from front to rear with respect to the plane of the figure). This shows that the person is moving to the rear (in the direction from front to rear with respect to the plane of the figure).

A without-motion icon 81B is yellow in color and is drawn in outline in the figure. The without-motion icon 81B represents a person with his/her feet put together and head facing to the rear (in the direction from front to rear with respect to the plane of the figure). This shows that the person is moving to the rear (in the direction from front to rear with respect to the plane of the figure).

The in-motion icon 82R is purple in color and is hatched in the figure. The in-motion icon 82R represents a person with his/her feet spread and head turning to the right. This shows that the person is moving to the right.

A without-motion icon 81R is yellow in color and is drawn in outline in the figure. The without-motion icon 81R represents a person with his/her feet put together and head turning to the right. This shows that the person is standing still, facing to the right.

The in-motion icons 82L, 82F, 82B, 82R are each designed as a person with his/her feet spread. This makes it possible for a user to intuitively know that the person corresponding to the icon is now moving. The in-motion icons 82L, 82F, 82B, 82R are created in step S35 illustrated in FIG. 14.

In contrast, the without-motion icons 81L, 81F, 81B, 81R are each designed as a person with his/her feet put together. This makes it possible for a user to intuitively know that the person corresponding to the icon is now standing still. The without-motion icons 81L, 81F, 81B, 81R are created in step S42 illustrated in FIG. 14.

Figure 16:
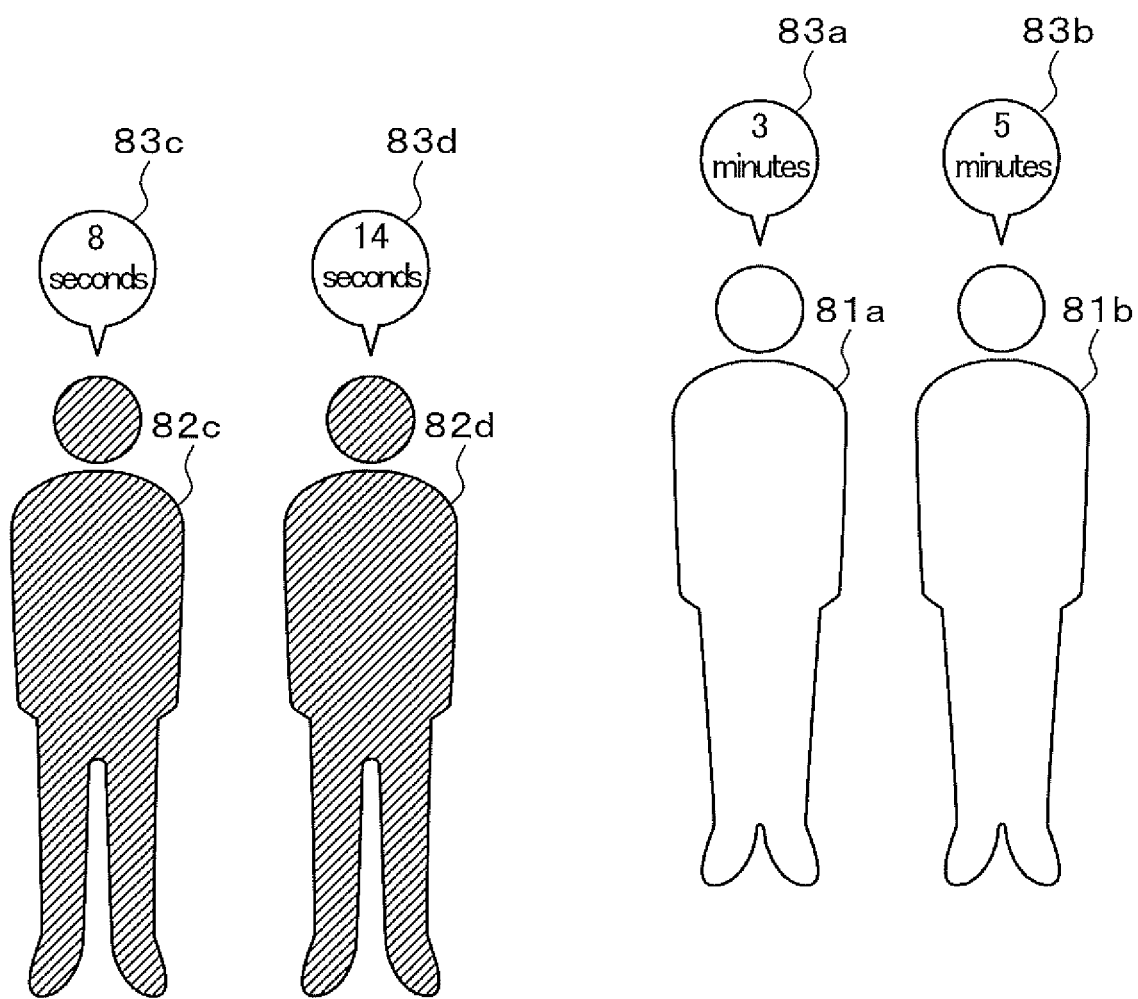
FIG. 16 is a diagram illustrating an icon indicating a jammed-up time of a person according to a still another variation of the present invention.

FIG. 16 is a diagram illustrating an icon indicating a jammed-up time of a person according to a still another variation.

An in-motion icon 82c is similar to the in-motion icon 82B illustrated in FIG. 15. An in-motion icon 82c, inside of a balloon of which displays "8 seconds", is placed above the in-motion icon 82c.

The in-motion icon 82d is similar to the in-motion icon 82B illustrated in FIG. 15. A jammed-up time icon 83d, inside of a balloon of which displays "14 seconds", is placed above the in-motion icon 82d. This makes it possible for a user to easily recognize a jammed-up time of a person who is moving.

Note that the jammed-up time of the in-motion icon 82 used herein means a period of time from when a person of interest enters a preset area until when the person leaves therefrom. The preset area is not specifically limited and may be an area within a photography angle of view of the video image photographing device 2 or may be an area from an entrance to an exit of a ticket gate at a station.

The without-motion icon 81a is similar to the without-motion icon 81B illustrated in FIG. 15. The jammed-up time icon 83a, inside of a balloon of which displays "3 minutes", is placed above the without-motion icon 81a.

The without-motion icon 81b is similar to the without-motion icon 81B illustrated in FIG. 15. The jammed-up time icon 83b, inside of a balloon of which displays "5 minutes", is placed above the without-motion icon 81b. This makes it possible for a user to easily recognize jammed-up time of a person who is standing still.

The jammed-up time icons 83a to 83d may be collectively referred to as the jammed-up time icon 83 hereinafter, unless it is especially necessary to distinguish from each other. The jammed-up time icon 83 is created in step S44 illustrated in FIG. 14. A jammed-up time of each person can be obtained by displaying the jammed-up time icon 83 in combination with any of the in-motion icons 82L, 82F, 82B, 82R, and the without-motion icons 81L, 81F, 81B, 81R. This makes it possible for a user to easily know a congestion state of an area of interest.

Figure 17:
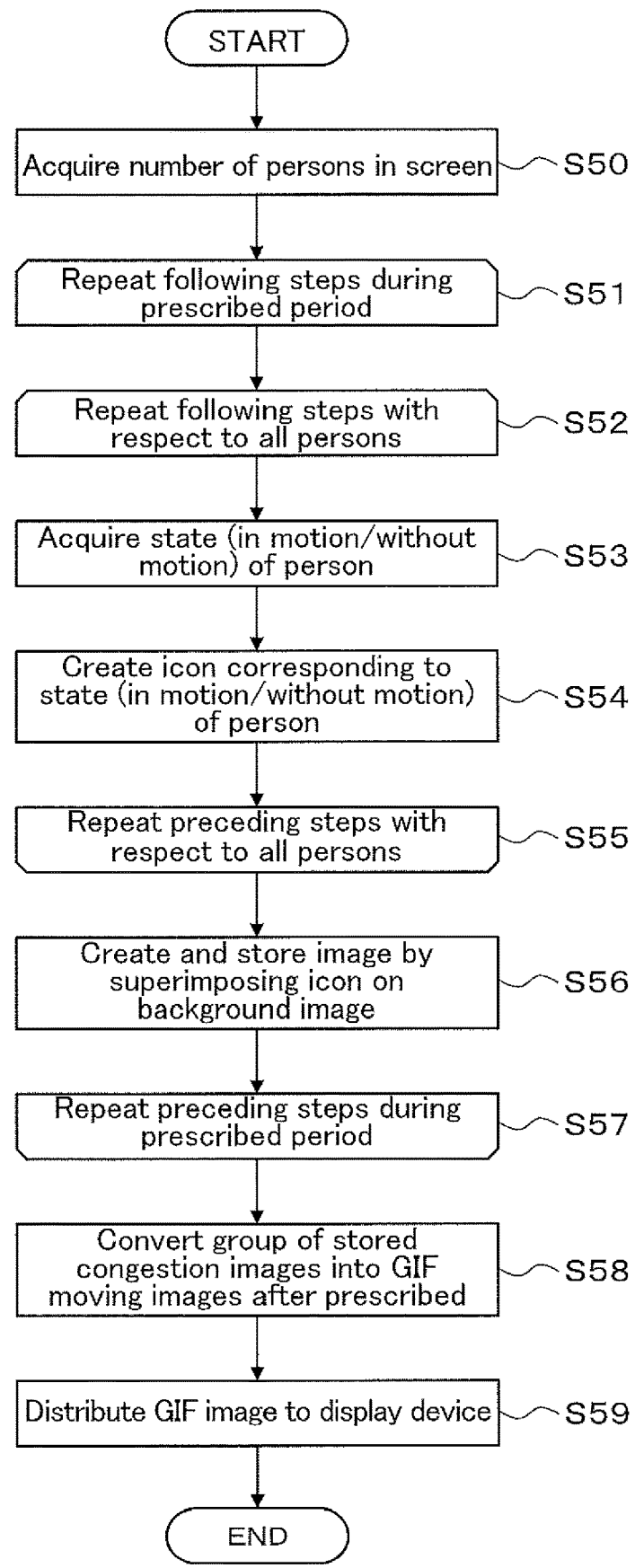
FIG. 17 is a flowchart illustrating a method of creating a moving image on congestion.

FIG. 17 is a flowchart illustrating a method of creating a moving image on congestion.

The person classifying unit 43 (see FIG. 1) acquires, as a start, the number of persons in a screen (a frame) contained in a moving image (step 50).

The congestion information analysis unit 45 repeatedly performs steps S51 to S57 during a prescribed period of time. The congestion information analysis unit 45 then repeatedly performs steps S52 to S55 for each of the persons in the image at each time during the period of time.

The congestion information analysis unit 45: acquires either "in motion" or "without motion" as a state of the each people (step 53); and creates an icon in accordance with the state of the each people (step 54). After repeating steps S52 to S55 for the each people in the image, the congestion information analysis unit 45 superimposes the created icon on a background image, to thereby create the congestion image 72. The congestion information analysis unit 45 then stores therein the created congestion image 72 (step 56).

After repeating steps S51 to S57 during the prescribed period of time, the congestion information analysis unit 45 converts the stored congestion image 72 into a GIF (Graphics Interchange Format) moving image (step 58). The congestion information analysis unit 45 then distributes (outputs) the converted GIF moving image to the display device 5 (step 59), and thereby terminates the processing of FIG. 17.

This makes it possible for the congestion analysis device 4 to distribute (output) the moving image showing congestion to the display device 5 of a user. The congestion moving image makes it possible for a user to more suitably know a change in congestion states.

Figure 18:
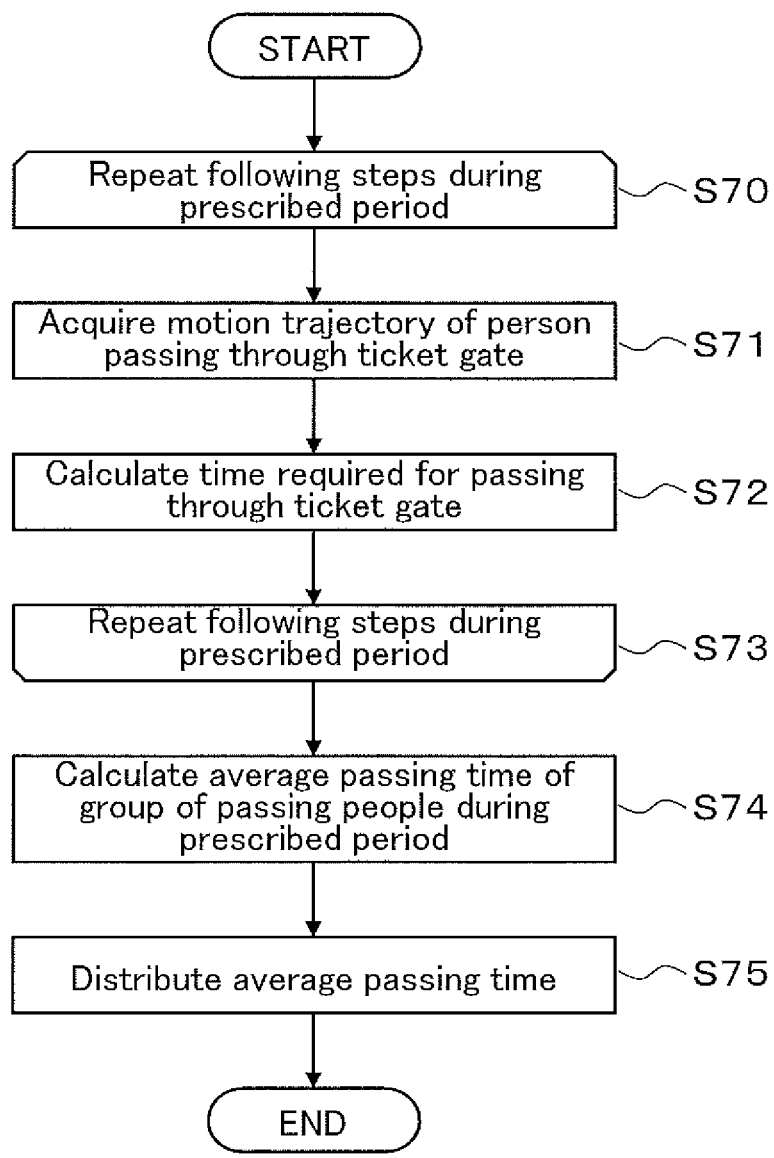
FIG. 18 is a flowchart illustrating a method of calculating an average passing time.

FIG. 18 is a flowchart illustrating a method of calculating an average passing time.

Not limited to the number and the state, the congestion information analysis unit 45 distributes any measure useful for a user related to a congestion degree. For example, the congestion information analysis unit 45 herein distributes an average passing time necessary for passing through a ticket gate, to the display device 5 of a user.

More specifically, the congestion information analysis unit 45 repeatedly performs steps S70 to S73 during a prescribed period of time. The congestion information analysis unit 45: acquires a motion trajectory of a person passing through the ticket gate (step 71); and calculates a time required for passing through the ticket gate (step 72).

After repeating the above steps during a prescribed period of time (step 73), the congestion information analysis unit 45 calculates an average passing time of a group of people who have passed through the ticket gate during the prescribed period of time (step 74). The congestion information analysis unit 45: distributes (outputs) the calculated average passing time to the display device 5 (step 75); and thereby terminates the processing of FIG. 18. This makes it possible for a user to: know an average passing time necessary for passing through the ticket gate; and also know a state of congestion at a station.

Not being limited to the average passing time required for passing through a ticket gate, the congestion information analysis unit 45 may count the number of people passing through a ticket gate per unit time and distribute the number of the average counted people passing through the ticket gate per unit time. This also makes it possible for a user to know a congestion state at a station.

The congestion information analysis unit 45 may separately calculate an average passing time required for passing through a ticket gate without any specific limitation, such as one average passing time at a time when a train arrives at a station and the other at a time other than that, and one at a rush hour and the other at a time other than that.

Figure 19:
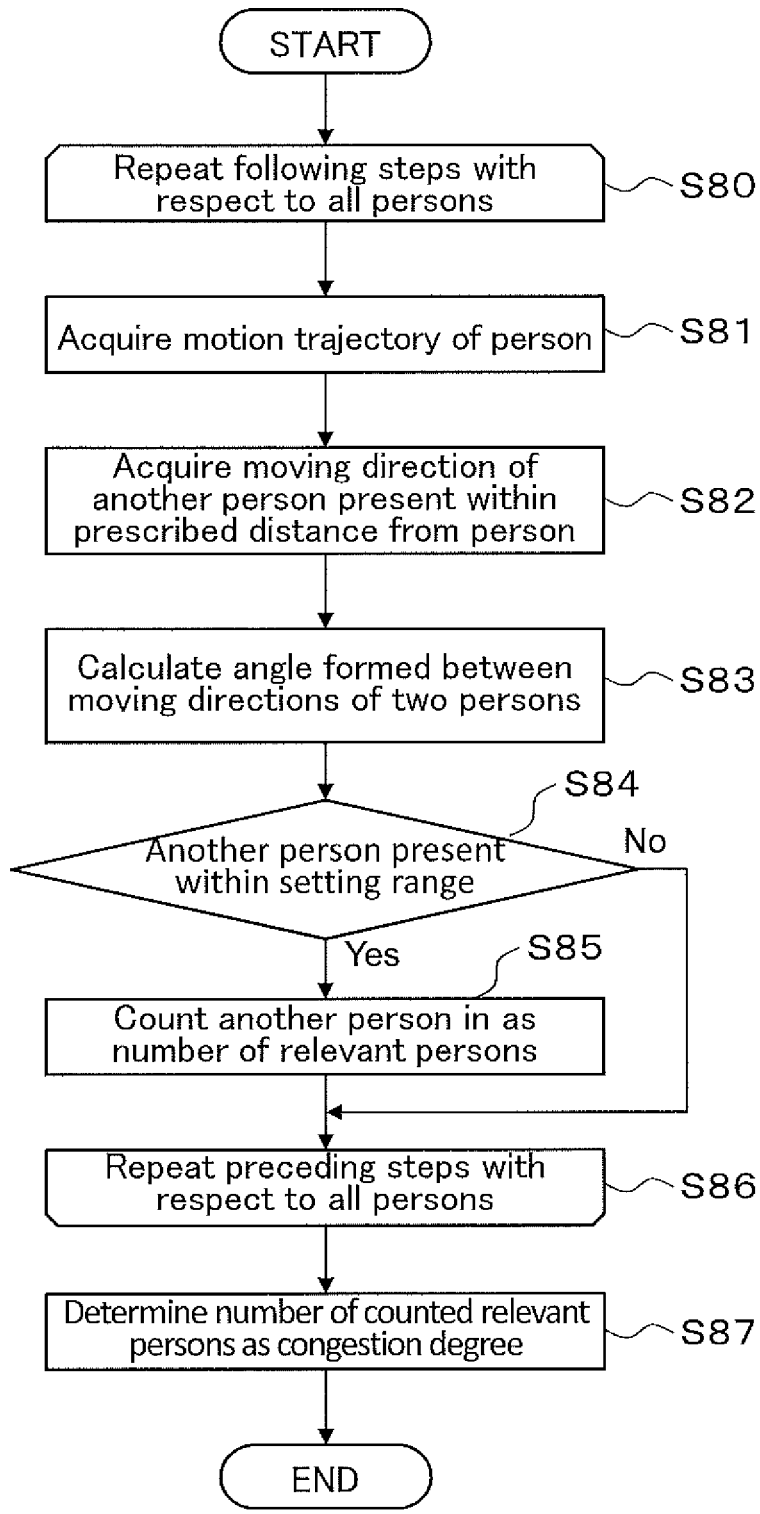
FIG. 19 is a flowchart illustrating a method of determining a congestion degree by easiness of moving.

FIG. 19 is a flowchart illustrating a method of determining a congestion degree by easiness of moving.

Not being limited to the number of people or a state thereof, the congestion information analysis unit 45 can determine a congestion degree by easiness of bumping into any other person or easiness of moving. This can achieve a congestion degree determination consistent with a user's own actual feeling. This is because one feels being crowded when one nearly collides with any other person.

The congestion information analysis unit 45 repeatedly performs steps S80 to S86 during a prescribed period of time.

The congestion information analysis unit 45: acquires a motion trajectory of a person of interest (step 81); and also acquires a moving direction of another person who is present within a prescribed distance from the person of interest (step 82). The moving direction used herein is a direction of movement when viewed from above. The congestion information analysis unit 45: performs a coordinate conversion of the motion trajectory of the person; and acquires a moving direction when viewed from the above, from an image photographed at an angle.

The congestion information analysis unit 45 then calculates an angle formed between respective moving directions of two persons (step 83). If the congestion information analysis unit 45 determines that another person is present within a setting range computed by the calculated angle (step 84), the congestion information analysis unit 45 counts the another person in as the number of relevant persons (step 85).

After repeatedly performing steps S80 to S86 during a prescribed period of time, the congestion information analysis unit 45 determines the number of the counted relevant persons as a congestion degree (step 87). This also makes it possible to determine a congestion degree consistent with a user's own actual feeling.

Figure 20:
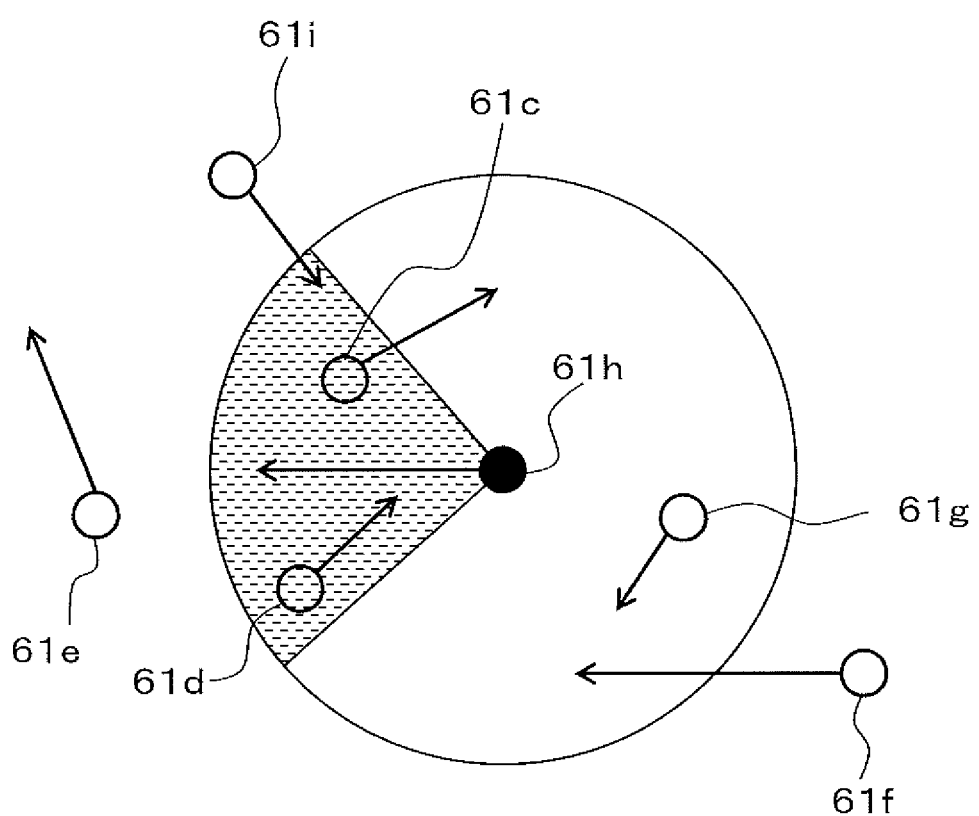
FIG. 20 is a conceptual diagram illustrating evaluation by the easiness of moving.

FIG. 20 is a conceptual diagram illustrating evaluation by easiness of moving. More specifically, FIG. 20 illustrates a concept of a determination condition used in step 84 of FIG. 19.

A moving direction of each of persons 61*c* to 61*i* is indicated by an arrow. In FIG. 20, the person 61*h* is exemplified to show a setting range in which there is a possibility of a bump with any other persons and which is hatched. The setting range has a shape of a fan which is in line symmetry with respect to a moving direction of the person 61*h* and has a central angle of about 90 degrees. In FIG. 20, the persons 61*c*, 61*d*, are positioned within the setting range, and the two are counted as the relevant persons.

This makes it possible to easily determine a congestion degree consistent with a user's own actual feeling.

<Variations>

The present invention is carried out not only by the above-detailed embodiment but also by variations of many types. For example, the above-described embodiment is intended to be illustrative of the present invention in an easily understandable manner, and the present invention is not limited to the one that includes all of the components explained in the embodiment. Part of a configuration of an embodiment of the present invention can be substituted by or added to that of another example. Part of a configuration of an example can be deleted.

Part or all of the configurations, features, processing parts, processing units, or the like described above may be realized by hardware such as, for example, integrated circuits. The above-described configurations, features, or the like may be realized by software in which, for example, a processor interprets and executes a program which realizes the feature. Data in a program, a table, a file, and the like for realizing such a feature can be stored in a storage device including a memory and a hard disk, or in a storage medium including a flash memory card and a DVD (Digital Versatile Disk).

In the embodiment and variations, only a control line or an information line which are deemed necessary for explanation is illustrated, and not all of them which are necessary in a product are illustrated. In practice, almost all configurations are deemed to be coupled to each other.

Variations of the present invention include, for example, (a) to (i) as shown below.

(a) A congestion degree at an entire station is determined not by a simple average of congestion degrees of areas but by an average thereof with weighting in accordance with the areas. For example, the congestion degree may be calculated with weighting to a person who is present near a ticket gate.

(b) Different thresholds of the determination conditions as standing-still and moving may be taken when a person is present near a ticket gate. This can conveniently prevent, even when a moving speed of the person is inevitably reduced in front of a ticket gate, the congestion analysis device 4 from detecting the reduction as a congestion.

(c) The congestion analysis device 4 may make a determination on congestion in accordance with departure and/or arrival of a train. For example, the congestion analysis device 4 may determine a determination condition to a higher level at a time immediately after departure and/or arrival of a train. This can conveniently prevent, even when a moving speed of a person is inevitably reduced upon departure and arrival of a train, the congestion analysis device 4 from detecting the reduction as a congestion.

(d) The congestion analysis device 4 may set a threshold in accordance with a normal congestion state. For example, the congestion analysis device 4 may determine a determination condition to a higher level at rush hour. This can conveniently prevent, even when a moving speed of a person is inevitably reduced at rush hour, the congestion analysis device 4 from detecting the reduction as a congestion.

(e) The congestion analysis device 4 may display an arrival state of a train at the same time as the heat map 71 or the congestion image 72 distributed to the display device 5.

(f) The congestion analysis device 4 may set a threshold in accordance with a normal congestion state. For example, the congestion analysis device 4 may determine a determination condition to a higher level at rush hour. This can conveniently prevent, even when a moving speed of a person is inevitably reduced at rush hour, the congestion analysis device 4 from detecting the reduction as a congestion.

(g) The congestion image 72 is created by superimposing the without-motion icon 81 or the in-motion icon 82 each indicating a person, on a previously-prepared background image. The congestion image 72 may be, however, created without specific limitation by, for example, superimposing an image created by pixelating a person-photographed area of an actual image, on a previously-prepared background image.

(h) The congestion analysis device 4 may analyze not only a station but also an event site, a shopping mall, a theme park, or the like, without specific limitation.

(i) A format of a congestion moving image distributed by the congestion analysis device 4 is not only a GIF moving image. The format may be, for example, MPEG (Moving Picture Experts Group) 1, MPEG 2, MPEG 4, AVI (Audio Video Interleave), or any other codec.

DESCRIPTION OF REFERENCE NUMERALS

1 congestion analysis system
2*a*, 2*b* video image photographing device
3 video image storage device
4 congestion analysis device
40 image input unit
41 feature point extraction unit
42 trajectory extraction unit
43 person classifying unit
44 motion trajectory determination unit (trajectory determination unit)
45 congestion information analysis unit
46 congestion information output unit (output unit)
47 processor
48*a*, 48*b* network interface
49 storage device
491 congestion analysis program
492 congestion information database
5 display device
61 person
62 feature point
63*a*-63*c* trajectory
64*a*, 64*b* person-representing rectangle
65*a*, 65*b* center of gravity
66*a*, 66*b* person motion trajectory
71 heat map
72 image on congestion
81, 81L, 81F, 81B, 81R without-motion icon
82, 82L, 82F, 82B, 82R in-motion icon
83*a*-83*d* jammed-up time icon
N network

The invention claimed is:

1. A congestion state visualization device, comprising a processor that is configured to:

photograph a moving image of a prescribed area, and detect a moving direction of a person therein from the moving image;

create a human-shaped icon indicating a moving direction of the person, in accordance with the detected moving direction of the person; and create a congestion image which is obtained by superimposing the human-shaped icon on a previously-prepared background image in which the prescribed area is photographed, but the person is not photographed;

wherein the background image is a previously-prepared image of an unmanned ticket gate; and wherein, if the human-shaped icon is overlapped with an image of a ticket gate in the unmanned ticket gate image, the processor creates a congestion image by superimposing the human-shaped icon on the unmanned ticket gate image with an overlapping portion removed therefrom.

2. The congestion state visualization device according to claim 1,
wherein the processor creates a human-shaped icon indicating a prescribed direction, in accordance with the moving direction of the person.

3. The congestion state visualization device according to claim 2,
wherein the processor creates a human-shaped icon indicating any one of at least four directions, in accordance with the moving direction of the person.

4. The congestion state visualization device according to claim 3, wherein the processor creates the human-shaped icon, at least an upper part of which indicates the moving direction of the person.

5. The congestion state visualization device according to claim 4,
wherein the processor: extracts a motion trajectory of the person from a plurality of the moving images; and detects a moving direction of the person based on the motion trajectory.

6. The congestion state visualization device according to claim 5,
wherein the processor:
detects whether the person is in a standing-still state or in a moving state; and creates respective different human-shaped icons, in accordance with whether the person is in the standing-still state or in the moving state.

7. The congestion state visualization device according to claim 6,
wherein the processor creates respective human-shaped icons in different colors, in accordance with whether the person is in the standing-still state or in the moving state.

8. The congestion state visualization device according to claim 7,
wherein a combination of the different colors is a combination of colors which even those who have color vision deficiency can readily recognize.

9. The congestion state visualization device according to claim 8,
wherein the processor:
extracts, from the moving image, the number of persons present in the moving image; and
outputs a congestion degree based on the number of the persons therein, the number of persons in standing-still state therein, and the number of persons in the moving state therein.

10. The congestion state visualization device according to claim 9, wherein the processor change a determination condition used when the congestion degree is determined, based on an external factor.

11. The congestion state visualization device according to claim 10,
wherein the processor outputs time information which is displayed together with the congestion image.

12. A congestion state visualization system, comprising:
a camera to photograph a moving image of a prescribed area; and
a processor to:
detect a moving direction of a person from the moving image taken by the camera; create a human-shaped icon indicating a moving direction of a person, in accordance with the detected moving direction of the person; and
create a congestion image which is obtained by superimposing the human-shaped icon on a previously-prepared background image in which the prescribed area is photographed, but the person is not photographed;
wherein the background image is a previously-prepared image of an unmanned ticket gate; and
wherein, if the human-shaped icon is overlapped with an image of a ticket gate in the unmanned ticket gate image, the processor creates a congestion image by superimposing the human-shaped icon on the unmanned ticket gate image with an overlapping portion removed therefrom.

13. The congestion state visualization system according to claim 12,
wherein the processor creates a human-shaped icon indicating a prescribed direction, in accordance with the moving direction of the person.

14. The congestion state visualization system according to claim 13,
wherein the processor creates a human-shaped icon indicating at least any one of four directions, in accordance with the moving direction of the person.

15. The congestion state visualization system according to claim 14,
wherein the processor creates the human-shaped icon, at least an upper part of which indicates the moving direction of the person.

16. A congestion state visualization method performed by a processor, comprising:
photographing a moving image of a prescribed area, and detecting a moving direction of a person therein from the moving image;
creating a human-shaped icon indicating a moving direction of the person, in accordance with the detected moving direction of a person;
creating a congestion image which is obtained by superimposing the human-shaped icon on a previously-prepared background image in which the prescribed area is photographed, but the person is not photographed, wherein the background image is a previously-prepared image of an unmanned ticket gate; and
if the human-shaped icon is overlapped with an image of a ticket gate in the unmanned ticket gate image, creating a congestion image by superimposing the human-shaped icon on the unmanned ticket gate image with an overlapping portion removed therefrom.

17. The congestion state visualization method according to claim 16, further comprising:
creating the human-shaped icon indicating a prescribed direction, in accordance with the moving direction of the person.

18. The congestion state visualization method according to claim 17, further comprising:
creating the human-shaped icon indicating at least any one of four directions, in accordance with the moving direction of the person.

19. The congestion state visualization method according to claim 16, further comprising:
creating the human-shaped icon, at least an upper part of which indicates the moving direction of the person.

20. The congestion state visualization method according to claim 16, further comprising:
extracting a motion trajectory of the person from a plurality of the moving images; and
detecting the moving direction of the person based on the motion trajectory.

* * * * *